(12) United States Patent
Hopkins

(10) Patent No.: US 12,197,972 B1
(45) Date of Patent: Jan. 14, 2025

(54) METHOD, APPARATUS, AND COMPUTER PROGRAM PRODUCT FOR GENERATING ALTERNATIVE EVALUATION MESSAGES

(71) Applicant: Mckesson Corporation, Irving, TX (US)

(72) Inventor: Stacy Hopkins, Tucker, GA (US)

(73) Assignee: McKesson Corporation, Irving, TX (US)

( * ) Notice: Subject to any disclaimer, the term of this patent is extended or adjusted under 35 U.S.C. 154(b) by 0 days.

(21) Appl. No.: 17/705,919

(22) Filed: Mar. 28, 2022

(51) Int. Cl.
G06F 9/54 (2006.01)
G06Q 30/02 (2023.01)

(52) U.S. Cl.
CPC ......... *G06F 9/546* (2013.01); *G06Q 30/0278* (2013.01)

(58) Field of Classification Search
None
See application file for complete search history.

(56) References Cited

U.S. PATENT DOCUMENTS

| | | |
|---|---|---|
| 5,012,035 A | 4/1991 | Sartori et al. |
| 5,173,851 A | 12/1992 | Off et al. |
| 5,595,342 A | 1/1997 | McNair et al. |
| 5,628,530 A | 5/1997 | Thornton |
| 5,726,092 A | 3/1998 | Mathews et al. |
| 5,757,898 A | 5/1998 | Nishikawa |
| 5,769,228 A | 6/1998 | Wroblewski |
| 6,012,035 A | 1/2000 | Freeman et al. |
| 6,111,218 A | 8/2000 | Akers et al. |
| 6,463,462 B1 | 10/2002 | Smith et al. |
| 6,595,342 B1 | 7/2003 | Maritzen et al. |
| 6,726,092 B2 | 4/2004 | Goldberg et al. |
| 6,757,898 B1 | 6/2004 | Ilsen et al. |

(Continued)

FOREIGN PATENT DOCUMENTS

| | | |
|---|---|---|
| AU | 2003243327 A | 12/2003 |
| CA | 2 482 370 A1 | 3/2006 |

(Continued)

OTHER PUBLICATIONS

United States Patent and Trademark Office, Final Office Action received for U.S. Appl. No. 16/816,460, dated Aug. 10, 2023, 14 pages, U.S.

(Continued)

*Primary Examiner* — Charles E Anya
(74) *Attorney, Agent, or Firm* — ALSTON & BIRD LLP

(57) ABSTRACT

A method, apparatus and computer program product are provided for generating a first evaluation message and an alternative evaluation messages in response to an electronic message from a requesting computer. Multiple responses, including a first evaluation message response and at least one alternative evaluation message response are returned to the requesting computer. A user can select one of the multiple responses for further forwarding to a verification system via a service provider computer. The service provider computer further facilitates verification of the selected response, such as an alternative evaluation system, via the verification system. The system enables generation of multiple pricing inquiries for alternative therapy and/or via different pricing schemas, to be imitated by a pharmacy computer upon a patient requesting a prescription refill.

16 Claims, 2 Drawing Sheets

(56) References Cited

U.S. PATENT DOCUMENTS

| | | |
|---|---|---|
| 6,769,228 B1 | 8/2004 | Mahar |
| 7,155,397 B2 | 12/2006 | Alexander et al. |
| 7,192,741 B2 | 3/2007 | Otte et al. |
| 7,337,129 B1 | 2/2008 | Lowry et al. |
| 7,346,768 B2 | 3/2008 | DiRienzo |
| 7,409,632 B1 | 8/2008 | DiRienzo |
| 7,426,476 B2 | 9/2008 | Munoz et al. |
| 7,734,483 B1 | 6/2010 | Smith et al. |
| 7,783,383 B2 | 8/2010 | Eliuk et al. |
| 7,840,424 B2 | 11/2010 | Wiley et al. |
| 7,856,364 B1 | 12/2010 | Wiley et al. |
| 7,912,741 B1 | 3/2011 | Pinsonneault |
| 7,921,021 B1 | 4/2011 | Newman |
| 8,036,913 B1 | 10/2011 | Pinsonneault et al. |
| 8,036,914 B1 | 10/2011 | Pinsonneault |
| 8,036,918 B1 | 10/2011 | Pinsonneault |
| 8,050,943 B1 | 11/2011 | Wiley et al. |
| 8,060,379 B1 | 11/2011 | Pinsonneault et al. |
| 8,126,743 B1 | 2/2012 | Wilk |
| 8,326,773 B1 | 12/2012 | Bellamy |
| 8,412,537 B1 | 4/2013 | Fenton et al. |
| 8,442,847 B1 | 5/2013 | Shrivastava |
| 8,489,415 B1 | 7/2013 | Ringold |
| 8,521,557 B1 | 8/2013 | Ringold et al. |
| 8,560,340 B1 | 10/2013 | Ringold |
| 8,645,162 B2 | 2/2014 | Boerger et al. |
| 8,671,018 B2 | 3/2014 | Thomas et al. |
| 8,712,797 B1 * | 4/2014 | Bezdek ............... G06Q 30/0283 |
| | | 705/400 |
| 8,738,399 B1 | 5/2014 | Abou Nader et al. |
| 8,786,650 B1 | 7/2014 | Eller et al. |
| 8,799,018 B1 | 8/2014 | Rea et al. |
| 8,984,059 B2 | 3/2015 | Johnson |
| 9,026,507 B2 | 5/2015 | Shraim et al. |
| 9,100,793 B2 | 8/2015 | Johnson |
| 9,171,322 B2 | 10/2015 | Spievak et al. |
| 9,356,947 B2 | 5/2016 | Shraim et al. |
| 9,760,871 B1 | 9/2017 | Pourfallah et al. |
| 9,786,023 B2 | 10/2017 | Cohan et al. |
| 10,109,027 B1 | 10/2018 | Stack |
| 10,157,262 B1 | 12/2018 | Pinsonneault |
| 10,331,855 B1 | 6/2019 | Bratton et al. |
| 10,417,380 B1 | 9/2019 | Kaye et al. |
| 10,489,552 B2 | 11/2019 | Pinsonneault |
| 10,496,793 B1 | 12/2019 | Lawrence et al. |
| 10,565,656 B1 | 2/2020 | Pinsonneault et al. |
| 10,606,984 B1 | 3/2020 | Kaye et al. |
| 10,616,146 B1 | 4/2020 | Hopkins et al. |
| 10,628,797 B2 | 4/2020 | Shraim et al. |
| 10,642,812 B1 | 5/2020 | Hopkins et al. |
| 10,713,694 B1 | 7/2020 | Harris et al. |
| 10,747,848 B2 | 8/2020 | Guinan |
| 10,778,618 B2 | 9/2020 | Karnin et al. |
| 10,862,832 B1 | 12/2020 | Harris |
| 10,924,545 B2 | 2/2021 | Momchilov et al. |
| 10,924,585 B1 | 2/2021 | Harris et al. |
| 10,929,932 B1 | 2/2021 | Golden et al. |
| 10,978,198 B1 | 4/2021 | Pinsonneault |
| 10,999,224 B1 | 5/2021 | Frechen et al. |
| 11,043,293 B1 | 6/2021 | Salzbrenner |
| 11,443,835 B1 | 9/2022 | Gangaikondan-Iyer et al. |
| 11,508,471 B1 * | 11/2022 | Anselmi ............... G16H 70/40 |
| 2001/0029483 A1 | 10/2001 | Schultz et al. |
| 2001/0037216 A1 | 11/2001 | Oscar et al. |
| 2001/0039589 A1 | 11/2001 | Aho et al. |
| 2001/0056359 A1 | 12/2001 | Abreu |
| 2002/0002495 A1 | 1/2002 | Ullman |
| 2002/0004812 A1 | 1/2002 | Motoyama |
| 2002/0032582 A1 | 3/2002 | Feeney et al. |
| 2002/0032583 A1 | 3/2002 | Joao |
| 2002/0035484 A1 | 3/2002 | McCormick |
| 2002/0087583 A1 | 7/2002 | Morgan et al. |
| 2002/0111832 A1 | 8/2002 | Judge |
| 2002/0133379 A1 | 9/2002 | Lewis et al. |
| 2002/0143579 A1 | 10/2002 | Docherty et al. |
| 2002/0147614 A1 | 10/2002 | Doerr et al. |
| 2002/0188552 A1 | 12/2002 | Kavounas et al. |
| 2002/0198831 A1 | 12/2002 | Patricelli et al. |
| 2003/0009367 A1 | 1/2003 | Morrison |
| 2003/0050796 A1 | 3/2003 | Baldwin |
| 2003/0050799 A1 | 3/2003 | Jay et al. |
| 2003/0069760 A1 | 4/2003 | Gelber |
| 2003/0074234 A1 | 4/2003 | Stasny |
| 2003/0097310 A1 | 5/2003 | Ono et al. |
| 2003/0130875 A1 * | 7/2003 | Hawash ............... G06Q 30/02 |
| | | 705/3 |
| 2003/0149625 A1 | 8/2003 | Leonardi et al. |
| 2003/0154163 A1 | 8/2003 | Phillips et al. |
| 2003/0172008 A1 | 9/2003 | Hage et al. |
| 2003/0187690 A1 | 10/2003 | Miller |
| 2003/0229540 A1 | 12/2003 | Algiene |
| 2003/0236747 A1 | 12/2003 | Sager |
| 2004/0006490 A1 | 1/2004 | Gingrich et al. |
| 2004/0039599 A1 | 2/2004 | Fralic |
| 2004/0054685 A1 | 3/2004 | Rahn et al. |
| 2004/0059607 A1 | 3/2004 | Ball et al. |
| 2004/0073456 A1 | 4/2004 | Gottlieb et al. |
| 2004/0073457 A1 | 4/2004 | Kalies |
| 2004/0078222 A1 | 4/2004 | Khan et al. |
| 2004/0078234 A1 | 4/2004 | Tallal, Jr. |
| 2004/0088187 A1 | 5/2004 | Chudy et al. |
| 2004/0103062 A1 | 5/2004 | Wood et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0199545 A1 | 10/2004 | Wagner et al. |
| 2004/0236630 A1 | 11/2004 | Kost et al. |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0065821 A1 | 3/2005 | Kalies, Jr. |
| 2005/0075932 A1 | 4/2005 | Mankoff |
| 2005/0080692 A1 | 4/2005 | Padam et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240442 A1 | 10/2005 | Lapsker et al. |
| 2005/0240473 A1 | 10/2005 | Ayers, Jr. et al. |
| 2005/0261939 A1 | 11/2005 | Augspurger et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0036470 A1 | 2/2006 | Oaks |
| 2006/0085231 A1 | 4/2006 | Brofman |
| 2006/0085385 A1 | 4/2006 | Foster et al. |
| 2006/0113376 A1 | 6/2006 | Reed et al. |
| 2006/0149595 A1 | 7/2006 | Williams et al. |
| 2006/0149784 A1 | 7/2006 | Tholl et al. |
| 2006/0184391 A1 | 8/2006 | Barre et al. |
| 2006/0212318 A1 | 9/2006 | Dooley |
| 2006/0212345 A1 | 9/2006 | Soza et al. |
| 2006/0224414 A1 | 10/2006 | Astrup et al. |
| 2006/0224417 A1 | 10/2006 | Werner |
| 2006/0224443 A1 | 10/2006 | Soza et al. |
| 2006/0235747 A1 | 10/2006 | Hammond et al. |
| 2006/0259363 A1 | 11/2006 | Jhetam et al. |
| 2007/0005402 A1 | 1/2007 | Kennedy et al. |
| 2007/0033137 A1 | 2/2007 | Provost et al. |
| 2007/0043589 A1 | 2/2007 | Warren et al. |
| 2007/0043595 A1 | 2/2007 | Pederson |
| 2007/0050209 A1 | 3/2007 | Yered |
| 2007/0050210 A1 | 3/2007 | Wiley, II |
| 2007/0067186 A1 | 3/2007 | Brenner et al. |
| 2007/0094133 A1 | 4/2007 | Anandarao et al. |
| 2007/0108053 A1 | 5/2007 | Cramer et al. |
| 2007/0136100 A1 | 6/2007 | Daugherty et al. |
| 2007/0162303 A1 | 7/2007 | Wiley et al. |
| 2007/0168228 A1 | 7/2007 | Lawless |
| 2007/0185799 A1 | 8/2007 | Harrison et al. |
| 2007/0191985 A1 | 8/2007 | Bain |
| 2007/0194352 A1 | 8/2007 | Han |
| 2007/0202886 A1 | 8/2007 | Dhebri et al. |
| 2007/0204043 A1 | 8/2007 | Espinosa et al. |

(56) References Cited

U.S. PATENT DOCUMENTS

| | | |
|---|---|---|
| 2007/0219813 A1 | 9/2007 | Moore |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0250341 A1 | 10/2007 | Howe et al. |
| 2007/0260750 A1 | 11/2007 | Feied et al. |
| 2007/0276697 A1 | 11/2007 | Wiley et al. |
| 2007/0294765 A1 | 12/2007 | Rihn et al. |
| 2007/0299915 A1 | 12/2007 | Shraim et al. |
| 2008/0033750 A1 | 2/2008 | Swiss et al. |
| 2008/0103836 A1 | 5/2008 | Park et al. |
| 2008/0112411 A1 | 5/2008 | Stafford et al. |
| 2008/0152107 A1 | 6/2008 | Mendiola |
| 2008/0183492 A1 | 7/2008 | Warren et al. |
| 2008/0215361 A1 | 9/2008 | Nunnari et al. |
| 2008/0262948 A1 | 10/2008 | Grady et al. |
| 2009/0006141 A1 | 1/2009 | Karr |
| 2009/0030719 A1 | 1/2009 | Nadas et al. |
| 2009/0064330 A1 | 3/2009 | Shraim et al. |
| 2009/0083064 A1 | 3/2009 | Mahinda |
| 2009/0094051 A1 | 4/2009 | Ard et al. |
| 2009/0100099 A1 | 4/2009 | Buckwalter |
| 2009/0106313 A1 | 4/2009 | Boldyga |
| 2009/0112707 A1 | 4/2009 | Weiss et al. |
| 2009/0198510 A1* | 8/2009 | Ditto .................... G06Q 30/02 |
| | | 705/2 |
| 2009/0204477 A1 | 8/2009 | Urso |
| 2009/0287558 A1 | 11/2009 | Seth et al. |
| 2009/0313112 A1 | 12/2009 | Champ et al. |
| 2009/0327363 A1 | 12/2009 | Cullen et al. |
| 2010/0030667 A1 | 2/2010 | Chudy et al. |
| 2010/0070298 A1 | 3/2010 | Kalies |
| 2010/0144259 A1 | 6/2010 | Allexon et al. |
| 2010/0145730 A1 | 6/2010 | Abreu |
| 2010/0161353 A1 | 6/2010 | Mayaud |
| 2010/0217622 A1 | 8/2010 | Brown et al. |
| 2010/0285821 A1 | 11/2010 | Smeeding et al. |
| 2010/0287001 A1 | 11/2010 | Pearce et al. |
| 2010/0293236 A1 | 11/2010 | Wisner et al. |
| 2011/0015978 A1 | 1/2011 | Welch, Jr. |
| 2011/0112871 A1 | 5/2011 | Simonowski et al. |
| 2011/0161109 A1 | 6/2011 | Pinsonneault et al. |
| 2011/0196697 A1 | 8/2011 | Akers |
| 2011/0288925 A1 | 11/2011 | Thomas et al. |
| 2012/0053958 A1 | 3/2012 | Marshall et al. |
| 2012/0136809 A1 | 5/2012 | Cannata et al. |
| 2012/0143627 A1 | 6/2012 | Ruben et al. |
| 2012/0166268 A1 | 6/2012 | Griffiths |
| 2012/0179481 A1 | 7/2012 | Patel et al. |
| 2012/0185263 A1 | 7/2012 | Emert |
| 2012/0185264 A1 | 7/2012 | Demogenes et al. |
| 2012/0253829 A1 | 10/2012 | John et al. |
| 2012/0253830 A1 | 10/2012 | John et al. |
| 2012/0253831 A1 | 10/2012 | John et al. |
| 2012/0253832 A1 | 10/2012 | John et al. |
| 2012/0253833 A1 | 10/2012 | John et al. |
| 2012/0253846 A1 | 10/2012 | John et al. |
| 2012/0265591 A1 | 10/2012 | Hwang |
| 2012/0323608 A1 | 12/2012 | Herzlinger |
| 2013/0041968 A1 | 2/2013 | Cohen et al. |
| 2013/0046610 A1 | 2/2013 | Abraham |
| 2013/0103602 A1 | 4/2013 | Melnick et al. |
| 2013/0144715 A1 | 6/2013 | Kranzley et al. |
| 2013/0179180 A1 | 7/2013 | Patra |
| 2013/0197980 A1 | 8/2013 | Lerner et al. |
| 2013/0246082 A1 | 9/2013 | Brylawski et al. |
| 2013/0311389 A1 | 11/2013 | Kaehler et al. |
| 2014/0039911 A1 | 2/2014 | Iyer |
| 2014/0088985 A1 | 3/2014 | Grant et al. |
| 2014/0214435 A1 | 7/2014 | Previdi |
| 2014/0249861 A1 | 9/2014 | Gamble et al. |
| 2014/0249864 A1 | 9/2014 | Sultan et al. |
| 2014/0278448 A1 | 9/2014 | Sadeghi et al. |
| 2014/0278456 A1 | 9/2014 | Milosevich et al. |
| 2014/0278531 A1* | 9/2014 | Gupta .................... G16H 10/00 |
| | | 705/2 |
| 2015/0032465 A1 | 1/2015 | Sundar et al. |
| 2015/0088557 A1 | 3/2015 | Huynh et al. |
| 2015/0142479 A1 | 5/2015 | Porter et al. |
| 2015/0149197 A1 | 5/2015 | Guinan |
| 2015/0154565 A1 | 6/2015 | Kaehler et al. |
| 2015/0154588 A1 | 6/2015 | Purves et al. |
| 2015/0195224 A1 | 7/2015 | Karnin et al. |
| 2015/0213195 A1 | 7/2015 | Blechman |
| 2015/0234991 A1 | 8/2015 | Pinsonneault |
| 2015/0235177 A1 | 8/2015 | Shraim et al. |
| 2015/0269695 A1 | 9/2015 | Pinsonneault et al. |
| 2015/0332422 A1 | 11/2015 | Gilmartin |
| 2015/0371000 A1 | 12/2015 | Pinsonneault |
| 2016/0012465 A1 | 1/2016 | Sharp |
| 2016/0103978 A1 | 4/2016 | Stong |
| 2016/0140593 A1 | 5/2016 | Smeeding et al. |
| 2016/0213512 A1 | 7/2016 | Palanker et al. |
| 2016/0267544 A1 | 9/2016 | Flood et al. |
| 2016/0267545 A1 | 9/2016 | Glass et al. |
| 2016/0307195 A1 | 10/2016 | Cantwell et al. |
| 2016/0321406 A1 | 11/2016 | Timmerman et al. |
| 2016/0321410 A1 | 11/2016 | Timmerman et al. |
| 2016/0358142 A1 | 12/2016 | Hillen |
| 2016/0359795 A1 | 12/2016 | Fehling |
| 2017/0034087 A1 | 2/2017 | Borenstein et al. |
| 2017/0220768 A1 | 8/2017 | Tanner, Jr. et al. |
| 2017/0323295 A1 | 11/2017 | Kranzley et al. |
| 2017/0324695 A1 | 11/2017 | Fischer et al. |
| 2017/0329922 A1 | 11/2017 | Eberting et al. |
| 2018/0012244 A1 | 1/2018 | Leonardi |
| 2018/0366810 A1 | 12/2018 | Nero et al. |
| 2019/0095582 A1* | 3/2019 | Waits .................... G16H 20/10 |
| 2019/0213212 A1 | 7/2019 | Adato et al. |
| 2019/0252049 A1* | 8/2019 | Fotsch .................... G16H 10/60 |
| 2019/0385733 A1 | 12/2019 | Kaye et al. |
| 2019/0385734 A1 | 12/2019 | Pinsonneault |
| 2020/0105392 A1 | 4/2020 | Karkazis et al. |
| 2020/0372988 A1 | 11/2020 | Bezdek et al. |
| 2021/0319887 A1 | 10/2021 | Derrick, Jr. et al. |
| 2021/0374876 A1* | 12/2021 | Cedergreen ............ G06Q 10/10 |

FOREIGN PATENT DOCUMENTS

| | | |
|---|---|---|
| CA | 2792252 A1 | 4/2013 |
| CA | 2810686 A1 | 10/2013 |
| CN | 102362778 | 2/2012 |
| KR | 100755440 | 9/2007 |
| KR | 101038074 | 6/2011 |
| KR | 101101692 | 12/2011 |
| KR | 20110138108 | 12/2011 |
| KR | 20110138572 | 12/2011 |
| KR | 101154858 | 6/2012 |
| WO | WO 1991/006917 A1 | 5/1991 |
| WO | WO 1995/003569 A2 | 2/1995 |
| WO | WO 1997/025682 A1 | 7/1997 |
| WO | WO 1998/050871 A1 | 11/1998 |
| WO | WO 2000/039737 A1 | 7/2000 |
| WO | WO 2003/098401 A2 | 11/2003 |
| WO | WO 2007/025295 A2 | 3/2007 |
| WO | WO 2007/094772 A1 | 8/2007 |
| WO | WO 2008/092109 A2 | 7/2008 |

OTHER PUBLICATIONS

United States Patent and Trademark Office, Non-Final Office Action received for U.S. Appl. No. 17/144,426, dated Jul. 13, 2023, 17 pages, U.S.

United States Patent and Trademark Office, Non-Final Office Action received for U.S. Appl. No. 17/158,118, dated Jul. 13, 2023, 18 pages, U.S.

United States Patent and Trademark Office, Notice of Allowance received for U.S. Appl. No. 16/552,021, dated Oct. 20, 2022, 14 pages, U.S.

U.S. Appl. No. 16/816,460, "Adaptive System and Method for Adjudicating Claims to Reduce Member Responsibility", Unpub-

(56) References Cited

OTHER PUBLICATIONS lished (Filing Date Mar. 12, 2020), (Michael Rea, Inventor), (RC Savings, LLC, Assignee).
United States Patent and Trademark Office, Non-Final Office Action received for U.S. Appl. No. 16/816,460, dated Mar. 3, 2023, 14 pages, U.S.
United States Patent and Trademark Office, Final Office Action received for U.S. Appl. No. 17/162,461, dated May 19, 2023, 23 pages, U.S.
United States Patent and Trademark Office, Advisory Action received for U.S. Appl. No. 17/158,118, dated May 26, 2023, 5 pages, U.S.
United States Patent and Trademark Office, Non-Final Office Action received for U.S. Appl. No. 17/674,366, dated Jun. 6, 2023, 75 pages, U.S.
United States Patent and Trademark Office, Miscellaneous Office Action, Restarting Period, received for U.S. Appl. No. 17/175,939, dated Jun. 14, 2023, 23 pages, U.S.
Viswanthan, Meera, et al., "Interventions to Improve Adherence to Self-administered Medications for Chronic Diseases in the United States," Annals of Internal Medicine, Dec. 4, 2012, retrieved from the Internet at <https://www.acpjournals.org/doi/full/10.7326/0003-4819-157-11-201212040-00538?rfr_dat=cr_pub++0pubmed&url_ver=Z39.88-2003&rfr_id=ori%3Arid%3Acrossref.org> on Jun. 14, 2023, 25 pages.
American Hospital Association, "Drug Price Proposals", dated Apr. 2019, retrieved from the Internet at <URL: https://www.aha.org/system/files/media/file/2019/04/aha-drug-policy-recommendations_2.pdf>, 8 pages.
California Health Care Foundation, "When the Price Is Not Right: State Options on Prescription Drug Pricing", dated Jun. 2016, retrieved from the Internet at: <URL: https://www.chcf.org/wp-content/uploads/2017/12/PDF-WhenStateRxPricing.pdf>, 16 pages.
Hsee, Christopher K., et al., "General Evaluability Theory", Perspectives on Psychological Science, Jul. 2010, pp. 343-355, vol. 5, No. 4, Sage Publications, Inc. on behalf of the Association for Psychological Science retrieved from the Internet at <URL: https://www.jstor.org/stable/41613442>.
United States Patent and Trademark Office, Advisory Action received for U.S. Appl. No. 16/867,286, dated Dec. 6, 2022, 8 pages, US.
United States Patent and Trademark Office, Advisory Action received for U.S. Appl. No. 17/175,939, dated Dec. 22, 2022, 5 pages, US.
United States Patent and Trademark Office, Final Office Action received for U.S. Appl. No. 17/144,426, dated Dec. 8, 2022, 21 pages, US.
United States Patent and Trademark Office, Notice of Allowance received for U.S. Appl. No. 16/832,318, dated Dec. 8, 2022, 26 pages, US.
Van Nuys, Ph.D., Karen, et al., "Prescription Drug Copayment Coupon Landscape", Drug Pricing White Paper, USC Leonard D. Schaeffer Center for Health Policy and Economics, Feb. 7, 2018, retrieved from the Internet at <URL: https://healthpolicy.usc.edu/research/prescription-drug-copayment-coupon-landscape/>, 21 pages.
Dubois, Robert W., "Rx Drug Costs: List Prices Versus Net Prices And The Importance Of Staying Within The Data", Health Affairs Blog, Mar. 2019, 7 pages.
Kamal, Rabah, et al., "What are the recent and forecasted trends in prescription drug spending?" Peterson-KFF Health System Tracker, Feb. 20, 2019, 19 pages, Peterson Center on Healthcare.
Cepeda, Maria Soledad, et al., "Quantification of missing prescriptions in commercial claims databases : results of a cohort study.", Pharmacoepidemiology and Drug Safety, Apr. 2017, pp. 386-392, vol. 26, Epub Jan. 25, 2017 on Wiley Online Library.
United States Patent and Trademark Office, Final Office Action received for U.S. Appl. No. 16/867,286, dated Sep. 8, 2022, 19 pages, U.S.
United States Patent and Trademark Office, Notice of Allowance received for U.S. Appl. No. 16/792,413, dated Sep. 8, 2022, 18 pages, U.S.
United States Patent and Trademark Office, Notice of Allowance received for U.S. Appl. No. 17/012,565, dated Sep. 21, 2022, 11 pages, U.S.
United States Patent and Trademark Office, Notice of Allowance received for U.S. Appl. No. 16/453,509, dated Oct. 3, 2022, 23 pages, U.S.
United States Patent and Trademark Office, Final Office Action received for U.S. Appl. No. 17/175,939, dated Oct. 5, 2022, 30 pages, U.S.
United States Patent and Trademark Office, Nonfinal Office Action received for U.S. Appl. No. 17/162,461, dated Oct. 5, 2022, 47 pages, U.S.
United States Patent and Trademark Office, Nonfinal Office Action received for U.S. Appl. No. 17/158,118, dated Oct. 7, 2022, 46 pages, U.S.
United States Patent and Trademark Office, Advisory Action received for U.S. Appl. No. 16/867,286, dated Feb. 6, 2023, 3 pages, US.
United States Patent and Trademark Office, Advisory Action received for U.S. Appl. No. 17/144,426, dated Mar. 3, 2023, 6 pages, US.
United States Patent and Trademark Office, Final Office Action received for U.S. Appl. No. 17/158,118, dated Mar. 3, 2023, 19 pages, US.
United States Patent and Trademark Office, Final Office Action received for U.S. Appl. No. 17/012,565, dated Jul. 25, 2022, 43 pages, U.S.
United States Patent and Trademark Office, Non-Final Office Action received for U.S. Appl. No. 16/867,286, dated Mar. 31, 2023, 16 pages, US.
United States Patent and Trademark Office, Non-Final Office Action received for U.S. Appl. No. 17/175,939, dated Apr. 26, 2023, 24 pages, US.
United States Patent and Trademark Office, Final Office Action received for U.S. Appl. No. 16/867,286, dated Sep. 19, 2023, 16 pages, US.
United States Patent and Trademark Office, Advisory Action received for U.S. Appl. No. 16/816,460, dated Oct. 19, 2023, 3 pages, US.
United States Patent and Trademark Office, Non-Final Office Action received for U.S. Appl. No. 17/162,461, dated Oct. 19, 2023, 25 pages, US.
United States Patent and Trademark Office, Final Office Action received for U.S. Appl. No. 17/674,366, dated Dec. 15, 2023, 53 pages, US.
United States Patent and Trademark Office, Final Office Action received for U.S. Appl. No. 17/144,426, dated Dec. 19, 2023, 22 pages, US.
United States Patent and Trademark Office, Final Office Action received for U.S. Appl. No. 17/158,118, dated Dec. 19, 2023, 22 pages, US.
United States Patent and Trademark Office, Non-Final Office Action received for U.S. Appl. No. 16/816,460, dated Dec. 22, 2023, 46 pages, US.
United States Patent and Trademark Office, Advisory Action received for U.S. Appl. No. 17/162,461, dated Aug. 24, 2023, 2 pages, US.
United States Patent and Trademark Office, Advisory Action received for U.S. Appl. No. 17/144,426, dated Mar. 21, 2024, 5 pages.
United States Patent and Trademark Office, Advisory Action received for U.S. Appl. No. 17/674,366, dated Mar. 22, 2024, 6 pages.
United States Patent and Trademark Office, Final Office Action received for U.S. Appl. No. 17/175,939, dated Mar. 1, 2024, 24 pages.
'Pharmacy Reject Codes NCPDP, 5 pages.
'St. Vincent's first to use Birmingham startup's information system. The Birmingham News [Online] Apr. 11, 2005. URL: http://www.awarix.com.
'St. Vincent's is Digital Flagship D. Lockridge; Birmingham Medical News [Online] Sep. 2005.
'Two automatic identification technology, neither new in the sense if being recent developments . . . Patient Safety & Quality Healthcare [Online] Aug. 2005_ URL: http://www_awarix.com.
Advisory Action for U.S. Appl. No. 14/193,294 mailed Nov. 9, 2017, 3 pages.
Advisory Action for U.S. Appl. No. 15/085,166 dated Apr. 11, 2019, 4 pages.

(56) References Cited

OTHER PUBLICATIONS

Advisory Action for U.S. Appl. No. 15/085,166 dated Apr. 29, 2020, 3 pages.
Advisory Action for U.S. Appl. No. 15/137,371 mailed Feb. 25, 2019, 5 pages.
Advisory Action for U.S. Appl. No. 15/427,746 mailed Jul. 2, 2019, 2 pages.
Advisory Action received for U.S. Appl. No. 15/085,166, dated Jan. 29, 2021, 3 pages, US.
Almaro, Moshe; "Recovery and Reuse of Unused Prescription Drugs" MIT What Matters: Aug. 2005.
American Society of Health-System Pharmacists (ASHP), "Is Prescribing the Next Step in the Evolution of Pharmacy?" May 15, 2012.
Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.
Anonymous, Medic; On-line Goes In-House, Chain Store Age Executive, Jan. 1987, vol. 63, Issue 1, USA; Abstract only.
Anonymous, Pharmacy Industry Leaders Launch Firm to Supply Real-Time Data, PR Newswire, Jul. 30, 2001, p. 1, New York, NY, USA.
Anonymous, TechRx Announces Successful Beta Deployment of T-Rex. PR Newswire. May 13, 2002.
Chu, Kuan-Yu, et al., "Incremental analysis of the reengineering of an outpatient billing process: an empirical study in a public hospital", BMC Health Services Research, Jun. 13, 2013, vol. 13, No. 215, 8 pages, BioMed Central LTD, UK.
CMS Updates Drug Dashboards with Prescription Drug Pricing and Spending Data, Data, Medicare Part D, Prescription drugs (Mar. 14, 2019).
Consalvo, Bob; "City of Boston in the City Council" hearing notice, Dec. 6, 2006.
Coping with Information Overload. The News Source for Healthcare Information Technology [Online] Nov. 2004. URL: http://www.awarix.com.
Decision to Grant European Patent Application No. 13809457.8 dated May 18, 2017.
Examiner's Answer for U.S. Appl. No. 14/145,027 mailed Sep. 7, 2016, 27 pages.
Extended European Search Report for European Application No. 13809457.8 dated Apr. 15, 2016, 6 pages.
Final Office Action for U.S. Appl. No. 12/140,015 mailed Jan. 31, 2011, 10 pages.
Final Office Action for U.S. Appl. No. 12/415,062 mailed Oct. 6, 2011, 18 pages.
Final Office Action for U.S. Appl. No. 12/555,589 mailed Apr. 11, 2012, 17 pages.
Final Office Action for U.S. Appl. No. 12/560,071 mailed Aug. 28, 2015, 8 pages.
Final Office Action for U.S. Appl. No. 12/560,071 mailed Nov. 8, 2012, 11 pages.
Final Office Action for U.S. Appl. No. 12/570,982 mailed Apr. 11, 2014, 22 pages.
Final Office Action for U.S. Appl. No. 12/570,982 mailed Aug. 28, 2015, 10 pages.
Final Office Action for U.S. Appl. No. 12/570,982 mailed Jan. 17, 2013, 19 pages.
Final Office Action for U.S. Appl. No. 12/730,015 mailed Aug. 14, 2012, 10 pages.
Final Office Action for U.S. Appl. No. 12/978,898 mailed May 16, 2013, 16 pages.
Final Office Action for U.S. Appl. No. 13/721,890 mailed Jun. 24, 2015, 14 pages.
Final Office Action for U.S. Appl. No. 13/721,890 mailed Nov. 25, 2016, 12 pages.
Final Office Action for U.S. Appl. No. 13/782,909 mailed May 31, 2016, 18 pages.
Final Office Action for U.S. Appl. No. 13/782,909 mailed Oct. 6, 2015, 24 pages.
Final Office Action for U.S. Appl. No. 13/804,175 mailed Oct. 6, 2015, 6 pages.
Final Office Action for U.S. Appl. No. 13/827,676 mailed Jul. 13, 2015, 17 pages.
Final Office Action for U.S. Appl. No. 14/090,113 mailed Jan. 6, 2016, 18 pages.
Final Office Action for U.S. Appl. No. 14/090,122 mailed Apr. 22, 2016, 13 pages.
Final Office Action for U.S. Appl. No. 14/145,027 mailed Nov. 19, 2015, 12 pages.
Final Office Action for U.S. Appl. No. 14/193,294 mailed May 2, 2016, 29 pages.
Final Office Action for U.S. Appl. No. 14/218,326 mailed Jun. 30, 2016, 17 pages.
Final Office Action for U.S. Appl. No. 15/085,166, dated Dec. 4, 2020, 11 pages.
Final Office Action for U.S. Appl. No. 15/137,371 mailed Nov. 28, 2018, 24 pages.
Final Office Action for U.S. Appl. No. 15/427,746 mailed Apr. 15, 2019, 9 pages.
Google NPL (non-patent literature) Search on "pharmacy payment benefit copay NDC database", retrieved from the Internet at <https://scholar.google.com/scholar?hl=en&as_sdt=3,47&g-pharmacy+payment+benefit+copay+NDC+database> on Feb. 20, 2022 at 3:02 pm, 1 page.
Google NPL (non-patent literature) Search on "pharmacy payment benefit copay NDC database", retrieved from the Internet at <https://www.google.com/search?g=pharmacy+payment+benefit+copay+ndc+database&source=int&tbs=cdr%3A1%2Ccd_min%3A1%2F1%2F2010%2 . . . > on Feb. 20, 2022 at 3:00 pm, 2 pages.
Google Patents Search (including Web Search History, Prior Art Search Printable History Generator) on "pharmacy payment benefit copay NDC database) (prescription) (code) (refills) (error code) country: US before:filing:Dec. 31, 2013", retrieved from the Internet at <https://patents.google.com/?q=pharmacy+payment+benefit+copay+NDC+database&q=prescription&q=code&q=refills&q=error+code&country=US&before-filing:Dec. 31, 2013> retrieved on Jun. 1, 2022, 4 pages.
Google Scholar Search (including Web Search History, Prior Art Search Printable History Generator) on "pharmacy payment benefit copay NDC database prescription . . . ", retrieved from the Internet at <https://scholar.google.com/scholar?hl=en&as_sdt=0%2C47&as_ylo=2010&as_yhi=2013&q=pharmacy+payment+benefit+copay+NDC+database+pres . . . > retrieved on Jun. 1, 2022, 3 pages.
How to Estimate the Cost of a Prescription. Pam Olson, Sr. Client Services Executive, Navitus Health Solutions (Year: 2015).
Kaplan et al., "Let the Needles Do the Talking! Evaluating the New Haven Needle Exchange." Interfaces 23:1, Jan.-Feb. 1993 (pp. 7-26).
Lamb, J., New Era of Electronic Medicine Management: E-PRESCRIPTIONS, Britain's Traditionally Cautious National Health Service is Starting Trials for Online Prescription, with the Aim of Cutting Costs, Finance Times, London, Feb. 21, 2001, p. 6, London, United Kingdom.
Letter Restarting Period for Response for U.S. Appl. No. 13/721,890 mailed Jan. 14, 2015, 11 pages.
Marie Chisholm et al. "Pharmaceutical Manufacturer Assistance Program." Arch Intern Med. vol. 162, Apr. 8, 2002.
Non-Final Office Action for U.S. Appl. No. 12/560,071 mailed Jun. 21, 2012, 11 pages.
Non-Final Office Action for U.S. Appl. No. 12/570,982 mailed Jun. 20, 2012, 10 pages.
Non-Final Office Action for U.S. Appl. No. 14/193,294 mailed Feb. 21, 2017, 32 pages.
Non-Final Office Action for U.S. Appl. No. 15/085,166 dated Jun. 12, 2020, 26 pages.
Non-Final Office Action for U.S. Appl. No. 16/180,915 dated Jun. 1, 2020, 40 pages.
Non-final Office Action for U.S. Appl. No. 12/140,015 mailed Oct. 8, 2010, 9 pages.

(56) References Cited

OTHER PUBLICATIONS

Non-final Office Action for U.S. Appl. No. 12/189,650 mailed Jan. 22, 2010, 11 pages.
Non-final Office Action for U.S. Appl. No. 12/189,654 mailed Jan. 22, 2010, 11 pages.
Non-Final Office Action for U.S. Appl. No. 12/388,956 mailed Feb. 3, 2011, 11 pages.
Non-Final Office Action for U.S. Appl. No. 12/415,062 mailed Mar. 30, 2011, 23 pages.
Non-Final Office Action for U.S. Appl. No. 12/555,589 mailed Dec. 9, 2011, 12 pages.
Non-Final Office Action for U.S. Appl. No. 12/560,071 mailed Sep. 23, 2014, 17 pages.
Non-Final Office Action for U.S. Appl. No. 12/570,982 mailed Sep. 12, 2013, 22 pages.
Non-Final Office Action for U.S. Appl. No. 12/730,015 mailed Mar. 6, 2012, 9 pages.
Non-Final Office Action for U.S. Appl. No. 12/956,411 mailed Jan. 24, 2011, 9 pages.
Non-Final Office Action for U.S. Appl. No. 12/978,898 mailed Feb. 6, 2013, 12 pages.
Non-Final Office Action for U.S. Appl. No. 12/982,395 mailed Dec. 11, 2012, 13 pages.
Non-Final Office Action for U.S. Appl. No. 13/721,890 mailed Jan. 9, 2015, 11 pages.
Non-Final Office Action for U.S. Appl. No. 13/721,890 mailed Jun. 14, 2016, 9 pages.
Non-final Office Action for U.S. Appl. No. 13/782,909 mailed Feb. 11, 2016, 17 pages.
Non-Final Office Action for U.S. Appl. No. 13/827,676 mailed Dec. 26, 2014, 13 pages.
Non-final Office Action for U.S. Appl. No. 13/827,676 mailed Dec. 30, 2015, 23 pages.
Non-Final Office Action for U.S. Appl. No. 14/145,027 mailed Mar. 23, 2015, 13 pages.
Non-Final Office Action for U.S. Appl. No. 15/137,371 mailed May 29, 2018, 19 pages.
Non-Final Office Action for U.S. Appl. No. 15/427,746 mailed Oct. 18, 2018, 9 pages.
Non-Final Office Action for U.S. Appl. No. 16/819,258 dated Sep. 4, 2020, 6 pages.
Non-Final Office Action received for U.S. Appl. No. 15/085,166, dated Mar. 17, 2021, 11 pages.
Non-Final Office Action received for U.S. Appl. No. 16/551,962, dated Mar. 2, 2021, 16 pages.
Non-Final Office Action received for U.S. Appl. No. 16/453,509 mailed Mar. 26, 2021, 45 pages.
Non-Final Office Action received for U.S. Appl. No. 16/832,318 mailed Apr. 23, 2021, 52 pages.
Notice of Allowance and Fees(s) Due for U.S. Appl. No. 15/925,011 dated Jan. 22, 2021, 15 pages.
Notice of Allowance for U.S. Appl. No. 16/180,915 dated Dec. 11, 2020, 23 pages.
Notice of Allowance for U.S. Appl. No. 11/674,069 mailed Jul. 19, 2010, 13 pages.
Notice of Allowance for U.S. Appl. No. 12/140,015 mailed Jun. 10, 2011, 10 pages.
Notice of Allowance for U.S. Appl. No. 12/165,221 mailed Nov. 16, 2010, 6 pages.
Notice of Allowance for U.S. Appl. No. 12/189,650 mailed Aug. 13, 2010, 11 pages.
Notice of Allowance for U.S. Appl. No. 12/388,956 mailed Jun. 14, 2011, 9 pages.
Notice of Allowance for U.S. Appl. No. 12/956,411 mailed Aug. 5, 2011, 8 pages.
Notice of Allowance for U.S. Appl. No. 12/982,395 mailed Apr. 24, 2013, 9 pages.
Notice of Allowance for U.S. Appl. No. 14/181,011 dated May 15, 2019, 9 pages.
Notice of Allowance for U.S. Appl. No. 15/137,371 mailed May 2, 2019, 11 pages.
Notice of Allowance for U.S. Appl. No. 15/427,746 mailed Dec. 4, 2019, 5 pages.
Notice of Allowance for U.S. Appl. No. 15/427,746 mailed Jul. 31, 2019, 8 pages.
Notice of Allowance received for U.S. Appl. No. 14/643,468, Oct. 24, 2018, 22 pages.
Notice of Allowance received for U.S. Appl. No. 14/181,011, filed Feb. 13, 2019, 9 pages.
Office Action for U.S. Appl. No. 14/193,294 dated Aug. 4, 2017, 31 pages.
Office Action for U.S. Appl. No. 14/193,294 dated Mar. 22, 2018, 28 pages.
Office Action for U.S. Appl. No. 14/193,294 dated Sep. 19, 2018, 27 pages.
Office Action for U.S. Appl. No. 14/229,043 dated Feb. 27, 2019, 18 pages.
Office Action for U.S. Appl. No. 14/229,043 dated Jul. 24, 2017, 19 pages.
Office Action for U.S. Appl. No. 14/229,043 dated Sep. 5, 2019, 22 pages.
Office Action for U.S. Appl. No. 14/229,043 dated Sep. 14, 2018, 17 pages.
Office Action for U.S. Appl. No. 14/643,468 dated Mar. 8, 2018, 11 pages.
Office Action for U.S. Appl. No. 15/085,166 dated Dec. 27, 2018, 24 pages.
Office Action for U.S. Appl. No. 15/085,166 dated Jun. 29, 2018, 19 pages.
Office Action for U.S. Appl. No. 15/085,166 dated Mar. 3, 2020, 25 pages.
Office Action for U.S. Appl. No. 15/085,166 dated Sep. 4, 2019, 23 pages.
Office Action for U.S. Appl. No. 15/422,184 dated Aug. 27, 2019, 16 pages.
Office Action for U.S. Appl. No. 15/422,184 dated Feb. 15, 2019, 15 pages.
Office Action for U.S. Appl. No. 15/422,184 dated Jan. 14, 2020, 19 pages.
Office Action for U.S. Appl. No. 15/422,184 dated Sep. 10, 2018, 13 pages.
Office Action for U.S. Appl. No. 15/925,011 dated Jun. 27, 2019, 15 pages.
Office Action for U.S. Appl. No. 15/925,011 dated Oct. 24, 2019, 19 pages.
Office Action for U.S. Appl. No. 15/925,948 dated Jun. 25, 2019, 13 pages.
Office Action for U.S. Appl. No. 15/925,948 dated Oct. 23, 2019, 18 pages.
Office Action for U.S. Appl. No. 12/570,982 mailed Apr. 8, 2015, 9 pages.
Office Action for U.S. Appl. No. 13/782,909 mailed Jun. 25, 2015, 16 pages.
Office Action for U.S. Appl. No. 13/804,175 mailed Mar. 13, 2015, 9 pages.
Office Action for U.S. Appl. No. 14/090,113 mailed Jun. 18, 2015, 14 pages.
Office Action for U.S. Appl. No. 14/090,122 mailed Oct. 21, 2016, 12 pages.
Office Action for U.S. Appl. No. 14/090,122 mailed Sep. 11, 2015, 10 pages.
Office Action for U.S. Appl. No. 14/181,011 mailed Feb. 29, 2016, 23 pages.
Office Action for U.S. Appl. No. 14/181,011 mailed Mar. 20, 2017, 28 pages.
Office Action for U.S. Appl. No. 14/181,011 mailed Oct. 20, 2016, 28 pages.
Office Action for U.S. Appl. No. 14/181,011 mailed Sep. 12, 2017, 17 pages.
Office Action for U.S. Appl. No. 14/193,294 mailed Dec. 17, 2015, 21 pages.

(56) References Cited

OTHER PUBLICATIONS

Office Action for U.S. Appl. No. 14/218,326 mailed Dec. 1, 2015, 13 pages.
Opar, Alisa; "Rising drug costs prompt new uses for old pills." Nature Medicine, 1211333 (2006).
PTAB Decision on Appeal for U.S. Appl. No. 14/145,027 mailed May 31, 2018, 11 pages.
PTAB Decision on Request for Rehearing for U.S. Appl. No. 14/145,027 mailed Aug. 30, 2018, 9 pages.
Sampson, R.J., Taking Control of Health Care Costs, Best's Review—Life Health Insurance Edition, Nov. 1983, vol. 84, Issue 7, USA; Abstract only.
Scientific and Technical Information Center, Report of Information from Dialog (NPL (non-patent literature) Search Results, Abstracts only), dated Nov. 1, 2021, (Year: 2021), 9 pages.
Siler, Sharon et al., "Safe Disposal of Unused Controlled Substances" Avalere Health 2008.
Strom, Stephanie; "Old Pills Finding New Medicine Cabinets" NY Times, May 18, 2005.
Subnotebooks, Phones, and More. St. Vincent's Gets on Track. Mobile Health Data [Online], Nov. 19, 2004. URL:http://www.awarix.com.
Supplemental Notice of Allowability received for U.S. Appl. No. 16/180,915, dated Jan. 28, 2021, 2 pages.
Supplemental Notice of Allowability received for U.S. Appl. No. 16/180,915, dated Mar. 12, 2021, 10 pages.
U.S. Notice of Allowance received for U.S. Appl. No. 16/819,258, dated Nov. 16, 2020, 8 pages, U.S.
U.S. Appl. No. 14/229,043, "Systems And Methods For Monitoring And Reporting Redemption Information At A Pharmacy For Patient Incentive Information Identified At The Time Of Prescribing," Unpublished (Filed Mar. 28, 2014), (Roger Pinsonneault, Inventor), (McKesson Corporation, Assignee), abandoned.
U.S. Appl. No. 15/084,034, "Prescription Provider System," Unpublished (Filed Mar. 29, 2016), (Scott Genone, Inventor), (McKesson Corporation, Assignee), abandoned.
U.S. Appl. No. 15/085,166, "Alternative Therapy Identification System", Unpublished (Filed Mar. 30, 2016), (Elizabeth Kaye, Inventor), (McKesson Corporation, Assignee), pending.
U.S. Appl. No. 16/832,318, "Method, Apparatus, And Computer Program Product for Estimated Prescription Costs", Unpublished (Filed Mar. 27, 2020), (Stacy Hopkins, Inventor), (McKesson Corporation, Assignee), pending.
U.S. Appl. No. 17/012,565, "Method, Apparatus, and Computer Program Product for Performing an Alternative Evaluation Procedure in Response to an Electronic Message," Unpublished (filing date Sep. 4, 2020), (Stacy Hopkins, et al., Inventors) (McKesson Corporation, Assignee), pending.
U.S. Appl. No. 17/092,705, "Computing System and Method for Automatically Reversing an Action Indicated by an Electronic Message," Unpublished (filing date Nov. 9, 2020), (Patrick Harris, Inventor) (McKesson Corporation, Assignee), pending.
U.S. Appl. No. 16/792,413, "Method, Apparatus and Computer Program Product for Partitioning Prescription Transaction Costs in an Electronic Prescription Transaction," Unpublished (filed Feb. 17, 2020), (Jared Burdine, Inventor) (McKesson Corporation, Assignee), pending.
U.S. Appl. No. 16/867,286, "Method, Apparatus, and Computer Program Product for Constructing Electronic Message Responses Dependent Upon Historical Information," Unpublished (filed May 5, 2020), (Jared Burdine, et al., Inventor) (McKesson Corporation, Assignee), pending.
U.S. Appl. No. 17/175,939, "Method, Apparatus, And Computer Program Product For Generating Inquiries In Different Formats, And Compiling Different Information Types In A Response," Unpublished (filed Feb. 15, 2021), (Stacy Hopkins, et al., Inventor) (McKesson Corporation, Assignee), pending.
U.S. Appl. No. 16/453,509, "Method, Apparatus, And Computer Program Product For Providing Estimated Prescription Costs," Unpublished (filed Jun. 26, 2019), (Stacy Hopkins, et al., Inventor) (Mckesson Corporation, Assignee), pending.
U.S. Appl. No. 17/499,976, "Method, Apparatus, And Computer Program Product For Providing Real-Time Pricing Information," Unpublished (filed Oct. 13, 2021), (Stacy Hopkins, et al., Inventor) (McKesson Corporation, Assignee), pending.
U.S. Appl. No. 17/501,532, "Method, Apparatus, And Computer Program Product For Providing Real-Time Pricing Information," Unpublished (filed Oct. 14, 2021), (Keith Crozier, et al., Inventor) (McKesson Corporation, Assignee), pending.
U.S. Appl. No. 17/219,526, "Method And Apparatus For Parsing And Differently Processing Different Portions Of A Request," Unpublished (filed Mar. 31, 2021), (Melissa Frechen, et al., Inventor) (McKesson Corporation, Assignee), pending.
U.S. Appl. No. 17/162,461, "Method, Apparatus, And Computer Program Product For Constructing Electronic Message Responses Dependent Upon Historical Information," Unpublished (filed Jan. 19, 2021), (Stewart Aragon, et al., Inventor) (McKesson Corporation, Assignee), pending.
U.S. Appl. No. 17/144,426, "Method, Apparatus, And Computer Program Product For Estimating A Target Quantitative Measure Based Upon Historical Electronic Messages," Unpublished (filed Jan. 8, 2021), (Stewart Aragon, et al., Inventor) (McKesson Corporation, Assignee), pending.
U.S. Appl. No. 17/158,118, "Method, Apparatus, And Computer Program Product For Estimating A Target Quantitative Measure Based Upon Historical Electronic Messages," Unpublished (filed Jan. 26, 2021), (Stewart Aragon, et al., Inventor) (McKesson Corporation, Assignee), pending.
U.S. Appl. No. 17/675,616, "Method, Apparatus, And Computer Program Product For Reformatting An Electronic Prescription Transaction," Unpublished (filed Feb. 18, 2022), (Phillip Draa, et al., Inventor) (McKesson Corporation, Assignee), pending.
U.S. Appl. No. 17/676,437, "Method, Apparatus, And Computer Program Product For Partitioning Prescription Transaction Costs In An Electronic Prescription Transaction," Unpublished (filed Feb. 21, 2022), (Phillip Draa, et al., Inventor) (McKesson Corporation, Assignee), pending.
United States Patent and Trademark Office, Advisory Action for U.S. Appl. No. 15/422,184, Jun. 25, 2019, 4 pages, U.S.A.
United States Patent and Trademark Office, Advisory Action for U.S. Appl. No. 15/422,184, filed Mar. 26, 2020, 5 pages, U.S.A.
United States Patent and Trademark Office, Advisory Action for U.S. Appl. No. 15/925,011, filed Jan. 31, 2020, 3 pages, U.S.A.
United States Patent and Trademark Office, Advisory Action for U.S. Appl. No. 15/925,948, filed Jan. 31, 2020, 4 pages, U.S.A.
United States Patent and Trademark Office, Advisory Action received for U.S. Appl. No. 16/453,509, dated Oct. 12, 2021, 5 pages, U.S.
United States Patent and Trademark Office, Advisory Action received for U.S. Appl. No. 16/832,318, dated Jan. 28, 2022, 4 pages, U.S.
United States Patent and Trademark Office, Advisory Action received for U.S. Appl. No. 16/792,413, dated Mar. 10, 2022, 4 pages, US.
United States Patent and Trademark Office, Corrected Notice of Allowability received for U.S. Appl. No. 15/085,166, dated Sep. 20, 2021, 6 pages, U.S.
United States Patent and Trademark Office, Final Office Action received for U.S. Appl. No. 16/453,509, dated Aug. 18, 2021, 16 pages, U.S.
United States Patent and Trademark Office, Final Office Action received for U.S. Appl. No. 16/551,962, dated Nov. 4, 2021, 32 pages, U.S.
United States Patent and Trademark Office, Final Office Action received for U.S. Appl. No. 16/832,318, dated Nov. 3, 2021, 22 pages, U.S.
United States Patent and Trademark Office, Final Office Action received for U.S. Appl. No. 16/792,413, dated Jan. 10, 2022, 80 pages, U.S.
United States Patent and Trademark Office, Non-Final Office Action received for U.S. Appl. No. 16/792,413, dated Aug. 5, 2021, 32 pages, U.S.
United States Patent and Trademark Office, Non-Final Office Action received for U.S. Appl. No. 15/085,166, dated Jan. 10, 2022, 12 pages, U.S.

(56) References Cited

OTHER PUBLICATIONS

United States Patent and Trademark Office, Non-Final Office Action received for U.S. Appl. No. 16/867,286, dated Feb. 22, 2022, 38 pages, U.S.

United States Patent and Trademark Office, Non-Final Office Action received for U.S. Appl. No. 17/012,565, dated Apr. 12, 2022, 19 pages, U.S.A.

United States Patent and Trademark Office, Non-Final Office Action received for U.S. Appl. No. 16/453,509, dated Apr. 28, 2022, 16 pages, U.S.A.

United States Patent and Trademark Office, Non-Final Office Action received for U.S. Appl. No. 16/552,021, dated May 3, 2022, 60 pages, U.S.A.

United States Patent and Trademark Office, Non-Final Office Action received for U.S. Appl. No. 17/175,939, dated May 12, 2022, 48 pages, U.S.A.

United States Patent and Trademark Office, Non-Final Office Action received for U.S. Appl. No. 16/792,413, dated May 24, 2022, 48 pages, US.

United States Patent and Trademark Office, Non-Final Office Action received for U.S. Appl. No. 17/144,426, dated May 31, 2022, 42 pages, US.

United States Patent and Trademark Office, Non-Final Office Action received for U.S. Appl. No. 16/832,318, dated Jun. 8, 2022, 17 pages, US.

United States Patent and Trademark Office, Notice of Allowability received for U.S. Appl. No. 15/422,184, filed Nov. 16, 2020, 2 pages, U.S.A.

United States Patent and Trademark Office, Notice of Allowance and Fee(s) Due received for U.S. Appl. No. 17/219,526, dated Mar. 22, 2022, 11 pages, US.

United States Patent and Trademark Office, Notice of Allowance and Fee(s) Due received for U.S. Appl. No. 16/551,962, dated Mar. 16, 2022, 10 pages, US.

United States Patent and Trademark Office, Notice of Allowance and Fee(s) Due received for U.S. Appl. No. 17/092,705, dated Mar. 24, 2022, 9 pages, US.

United States Patent and Trademark Office, Notice of Allowance and Fee(s) Due received for U.S. Appl. No. 16/551,962, dated Mar. 1, 2022, 14 pages, US.

United States Patent and Trademark Office, Notice of Allowance received for U.S. Appl. No. 15/422,184, filed Oct. 13, 2020, 12 pages, U.S.A.

United States Patent and Trademark Office, Notice of Allowance received for U.S. Appl. No. 15/925,948, filed Nov. 5, 2020, 22 pages, U.S.A.

United States Patent and Trademark Office, Notice of Allowance received for U.S. Appl. No. 15/085,166, dated Sep. 10, 2021, 21 pages, U.S.

United States Patent and Trademark Office, Notice of Allowance received for U.S. Appl. No. 15/085,166, dated Jun. 15, 2022, 18 pages, U.S.

United States Patent and Trademark Office, Notice of Allowance received for U.S. Appl. No. 17/092,705, dated Dec. 23, 2021, 42 pages, U.S.

United States Patent and Trademark Office, Notice of Allowance received for U.S. Appl. No. 16/043,401, dated Aug. 10, 2020, 9 pages, U.S.A.

United States Patent and Trademark Office, Notice of Allowance received for U.S. Appl. No. 17/219,526, dated Feb. 3, 2022, 48 pages, U.S.

United States Patent and Trademark Office, Notice of Allowance received for U.S. Appl. No. 17/092,705, dated May 31, 2022, 9 pages, US.

United States Patent and Trademark Office, Notice of Allowance received for U.S. Appl. No. 17/219,526, dated Jun. 2, 2022, 8 pages, US.

United States Patent and Trademark Office, Notice of Allowance received for U.S. Appl. No. 16/551,962, dated Jun. 8, 2022, 11 pages, US.

United States Patent and Trademark Office, Office Action for U.S. Appl. No. 15/925,011, filed Apr. 8, 2020, 17 pages, U.S.A.

United States Patent and Trademark Office, Office Action for U.S. Appl. No. 15/925,948, filed Mar. 23, 2020, 29 pages, U.S.A.

United States Patent and Trademark Office, Office Action received for U.S. Appl. No. 15/422,184, filed May 18, 2020, 31 pages, U.S.A.

United States Patent and Trademark Office, Office Action received for U.S. Appl. No. 15/925,011, filed Oct. 8, 2020, 8 pages, U.S.A.

Wisconsin Physicians Service (WPS) Insurance Corporation, "How to Read Your Explanation of Benefits Chart," Jun. 16, 2012.

www.ncoil.org/news/DrugCards2.doc dated Apr. 2002, 5 pages.

Zhu, V. et al., "Data for drugs available through low-cost prescription drug programs are available through pharmacy benefit manager and claims data," BMC Clinical Pharmacology, Jun. 22, 2012, vol. 12, No. 12., BioMed Central Ltd., UK.

Bowman, Michelle, et al., "Risk Assessment of Pharmacies & Electronic Prescriptions," 2019 IEEE/ACM International Conference on Advances in Social Networks Analysis and Mining (ASONAM), Aug. 27-30, 2019, pp. 641-644, Vancouver, BC, Canada.

United States Patent and Trademark Office, Final Office Action received for U.S. Appl. No. 16/816,460, dated May 3, 2024, 22 pages, U.S.

United States Patent and Trademark Office, Non-Final Office Action received for U.S. Appl. No. 17/675,616, dated May 8, 2024, 74 pages, U.S.

United States Patent and Trademark Office, Non-Final Office Action received for U.S. Appl. No. 17/676,437, dated May 9, 2024, 73 pages, U.S.

Coase, R. H., "The Nature of the Firm", Economica, Nov. 1937, pp. 386-405, vol. 4, No. 16, Blackwell Publishing for London School of Economics and Political Science, retrieved from the Internet at http://www.jstor.org/stable/2626876 on Nov. 7, 2011.

Gemmill, Marin, "The price elasticity of demand for prescription drugs: An exploration of demand in different settings", Doctor of Philosophy Thesis submitted to the London School of Economics and Political Science, Jan. 2008, 380 pages, UMI No. U615895, UMI Dissertation Publishing, ProQuest LLC, US.

United States Patent and Trademark Office, Examiner's Answer received for U.S. Appl. No. 16/867,286, dated Jun. 28, 2024, 9 pages, US.

United States Patent and Trademark Office, Non-Final Office Action received for U.S. Appl. No. 17/144,426, dated Jul. 18, 2024, 19 pages, US.

United States Patent and Trademark Office, Non-Final Office Action received for U.S. Appl. No. 17/158,118, dated Jul. 18, 2024, 22 pages, US.

United States Patent and Trademark Office, Notice of Allowance received for U.S. Appl. No. 17/846,373, dated Jul. 25, 2024, 16 pages, US.

United States Patent and Trademark Office, Non-Final Office Action received for U.S. Appl. No. 17/846,373, dated Apr. 5, 2024, 76 pages.

United States Patent and Trademark Office, Non-Final Office Action received for U.S. Appl. No. 17/674,366, dated Jun. 5, 2024, 54 pages, US.

United States Patent and Trademark Office, Final Office Action received for U.S. Appl. No. 17/162,461, dated Jun. 4, 2024, 38 pages, US.

United States Patent and Trademark Office, Advisory Action received for U.S. Appl. No. 16/816,460, dated Aug. 1, 2024, 3 pages, U.S.

United States Patent and Trademark Office, Advisory Action received for U.S. Appl. No. 17/162,461, dated Aug. 19, 2024, 2 pages, U.S.

United States Patent and Trademark Office, Non-Final Office Action received for U.S. Appl. No. 18/098,150, dated Aug. 27, 2024, 61 pages, U.S.

United States Patent and Trademark Office, Interview Summary received for U.S. Appl. No. 17/675,616, dated Aug. 15, 2024, 8 pages, U.S.

Liu, Shiyong, et al., "Evaluating Cost-Effectiveness Of Treatment Options For Diabetes Patients Using System Dynamics Modeling", Proceeding of the 2018 Winter Simulation Conference (WSC), Dec. 9-12, 2018, pp. 2577-2588, IEEE, Gothenburg, Sweden.

(56) References Cited

OTHER PUBLICATIONS

Tiriveedhi, V., "Impact of Precision Medicine on Drug Repositioning and Pricing: A Too Small to Thrive Crisis", Journal of Personalized Medicine, Nov. 5, 2018, 11 pages, vol. 8, No. 36, MDPI, Switzerland.

United States Patent and Trademark Office, Notice of Allowance received for U.S. Appl. No. 17/675,616, dated Sep. 25, 2024, 21 pages, USA.

United States Patent and Trademark Office, Notice of Allowance received for U.S. Appl. No. 17/676,437, dated Sep. 25, 2024, 20 pages, USA.

United States Patent and Trademark Office, Examiner Interview Summary received for U.S. Appl. No. 17/144,426, dated Oct. 22, 2024, 8 pages, U.S.

United States Patent and Trademark Office, Examiner Interview Summary received for U.S. Appl. No. 17/158,118, dated Oct. 22, 2024, 8 pages, U.S.

United States Patent and Trademark Office, Non-Final Office Action received for U.S. Appl. No. 17/501,532, dated Oct. 17, 2024, 37 pages, U.S.

United States Patent and Trademark Office, Non-Final Office Action received for U.S. Appl. No. 17/499,976, dated Oct. 1, 2024, 79 pages, U.S.

United States Patent and Trademark Office, Non-Final Office Action received for U.S. Appl. No. 17/175,939, dated Oct. 24, 2024, 17 pages, U.S.

United States Patent & Trademark Office, Examiner Interview Summary received for U.S. Appl. No. 18/098,150, dated Nov. 18, 2024, 3 pages, U.S.

United States Patent & Trademark Office, Non-Final Office Action received for U.S. Appl. No. 16/816,460, dated Nov. 21, 2024, 28 pages, US.

* cited by examiner

METHOD, APPARATUS, AND COMPUTER PROGRAM PRODUCT FOR GENERATING ALTERNATIVE EVALUATION MESSAGES

TECHNOLOGICAL FIELD

Embodiments of the present invention relate generally to electronic messages, and more particularly, to methods, apparatuses, and computer program products for generating alternative evaluation messages, facilitating selection thereof, and facilitating approval by a verification system.

BACKGROUND

Electronic messages are frequently transmitted and routed according to an identifier in the message. A processing system may therefore route the message as directed, await a response, and forward or route the response message to the message originator or requestor. However, in certain examples, different information to be included in the message response may be obtained from different evaluation systems, but the message router may not have the necessary routing information available to obtain the different information. In such examples, the requesting system may not be able to obtain the different information or may not be configured to poll the different evaluation systems.

BRIEF SUMMARY

Methods, apparatuses, and computer program products are therefore provided generating alternative evaluation messages, facilitating selection thereof, and facilitating approval by a verification system. An apparatus is provided, including at least one processor and at least one memory including computer program code, the at least one memory and the computer program code configured to, with the processor, cause the apparatus to at least parse an electronic message received from a requesting computer to determine a first evaluation system, and a verification indication, and generate and cause transmission of a first evaluation message to at least the first evaluation system. The at least one memory and the computer program code are further configured to, with the processor, generate and cause transmission of at least one alternative evaluation message, wherein at least one of (a) the at least one alternative evaluation message comprises at least a second product identifier, or (b) the at least one alternative evaluation message is transmitted to a second evaluation system.

In response to receiving a first evaluation message response and at least one alternative evaluation message response, cause transmission of the first evaluation message response and the at least one alternative evaluation message response to the requesting computer. The at least one memory and the computer program code are further configured to, with the processor, receive an indication of a selection of an alternative evaluation message response, modify the electronic message to reflect the selected alternative evaluation message response, and cause transmission of the modified electronic message to a verification system identified by the routing indication.

The first evaluation message response and the at least one alternative evaluation message response is caused to be transmitted to the requesting computer in real-time or near real-time relative to receiving the electronic message from the requesting computer.

In certain embodiments, generating the at least one alternative evaluation message comprises determining the second product identifier by identifying a formulary alternative to a product identified by the first product identifier. The first evaluation system may be associated with a prescription benefit plan and the second evaluation system is associated with a cash price.

The at least one memory and the computer program code configured to, with the processor, cause the apparatus to at least cause display of the at least first evaluation message response and the alternative evaluation message response via the requesting computer. The at least one of the first evaluation message response or the at least one alternative evaluation message response comprises deductible stage information. The at least one memory and the computer program code are configured to, with the processor, cause the apparatus to at least receive a response from the verification system indicating approval, and cause transmission of the response to the requesting computer.

A method is provided, including parsing an electronic message received from a requesting computer to determine a first evaluation system, and a verification indication, generating and cause transmission of a first evaluation message to at least the first evaluation system, and generating and cause transmission of at least one alternative evaluation message, wherein at least one of (a) the at least one alternative evaluation message comprises at least a second product identifier, or (b) the at least one alternative evaluation message is transmitted to a second evaluation system. The method further includes, in response to receiving a first evaluation message response and at least one alternative evaluation message response, causing transmission of the first evaluation message response and the at least one alternative evaluation message response to the requesting computer. The method further includes receiving an indication of a selection of an alternative evaluation message response, modifying the electronic message to reflect the selected alternative evaluation message response, and causing transmission of the modified electronic message to a verification system identified by the routing indication. The method may further include causing display of the at least first evaluation message response and the alternative evaluation message response via the requesting computer, receiving a response from the verification system indicating approval, and causing transmission of the response to the requesting computer.

A computer program product comprising at least one non-transitory computer-readable storage medium having computer-executable program code instructions stored therein, the computer-executable program code instructions comprising program code instructions to parse an electronic message received from a requesting computer to determine a first evaluation system, and a verification indication, and to generate and cause transmission of a first evaluation message to at least the first evaluation system. The computer-executable program code instructions further comprise program code instructions to generate and cause transmission of at least one alternative evaluation message, wherein at least one of (a) the at least one alternative evaluation message comprises at least a second product identifier, or (b) the at least one alternative evaluation message is transmitted to a second evaluation system. In response to receiving a first evaluation message response and at least one alternative evaluation message response, the computer-executable program code instructions further comprise program code instructions to cause transmission of the first evaluation message response and the at least one alternative evaluation message response to the requesting computer. The computer-executable program code instructions further comprise program code instructions to receive an indication of a selection of an alternative evaluation message response, modify the electronic message to reflect the selected alternative evaluation message response, and cause transmission of the modified electronic message to a verification system identified by the routing indication. The computer-executable program code instructions further comprise program code instructions to cause display of the at least first evaluation message response and the alternative evaluation message response via the requesting computer.

An apparatus is provided, including means for parsing an electronic message received from a requesting computer to determine a first evaluation system, and a verification indication, means for generating and cause transmission of a first evaluation message to at least the first evaluation system, and means generating and cause transmission of at least one alternative evaluation message, wherein at least one of (a) the at least one alternative evaluation message comprises at least a second product identifier, or (b) the at least one alternative evaluation message is transmitted to a second evaluation system. The apparatus further includes means for, in response to receiving a first evaluation message response and at least one alternative evaluation message response, causing transmission of the first evaluation message response and the at least one alternative evaluation message response to the requesting computer. The apparatus further includes means for receiving an indication of a selection of an alternative evaluation message response, means for modifying the electronic message to reflect the selected alternative evaluation message response, and means for causing transmission of the modified electronic message to a verification system identified by the routing indication. The apparatus further includes means for causing display of the at least first evaluation message response and the alternative evaluation message response via the requesting computer, means for receiving a response from the verification system indicating approval, and means for causing transmission of the response to the requesting computer.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
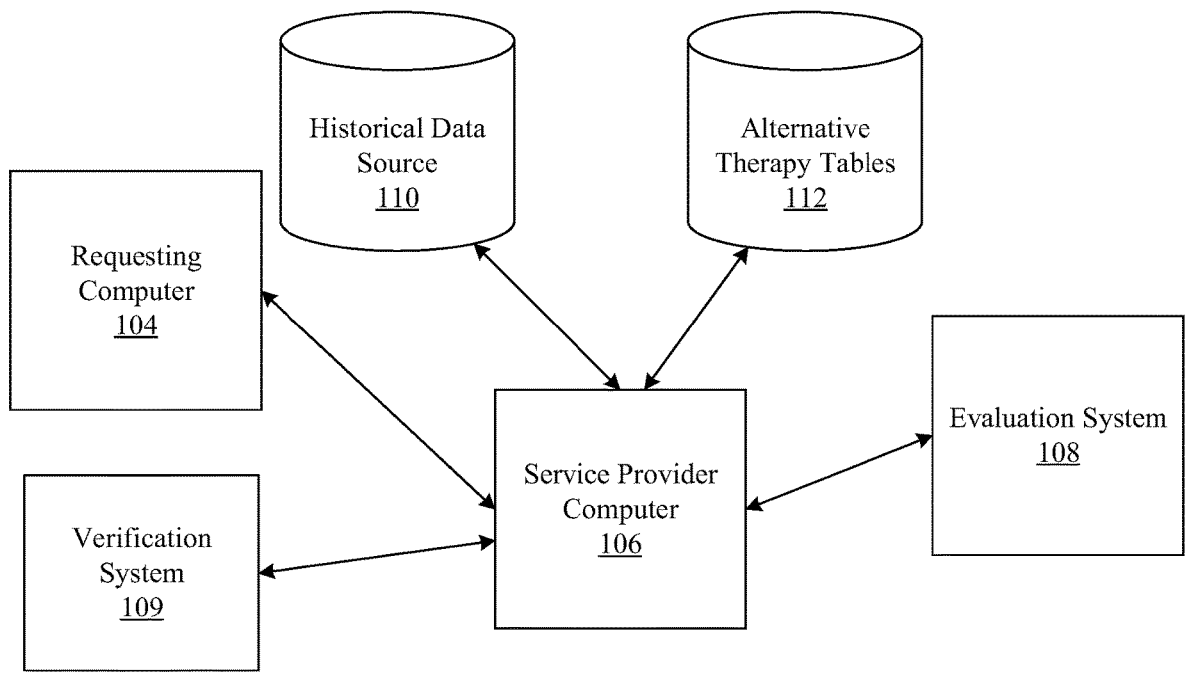
Figure 2:
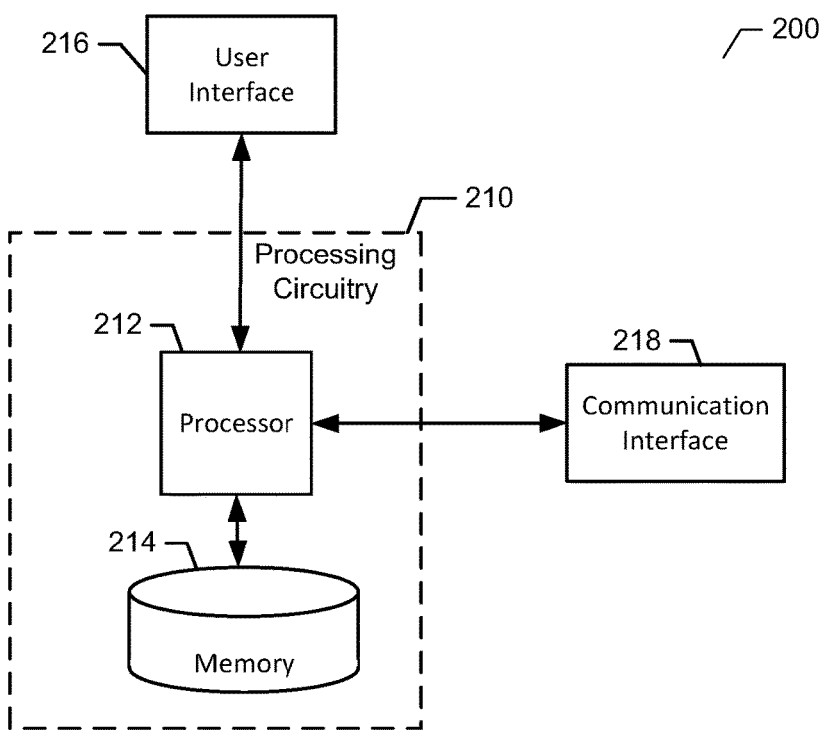
Figure 3:
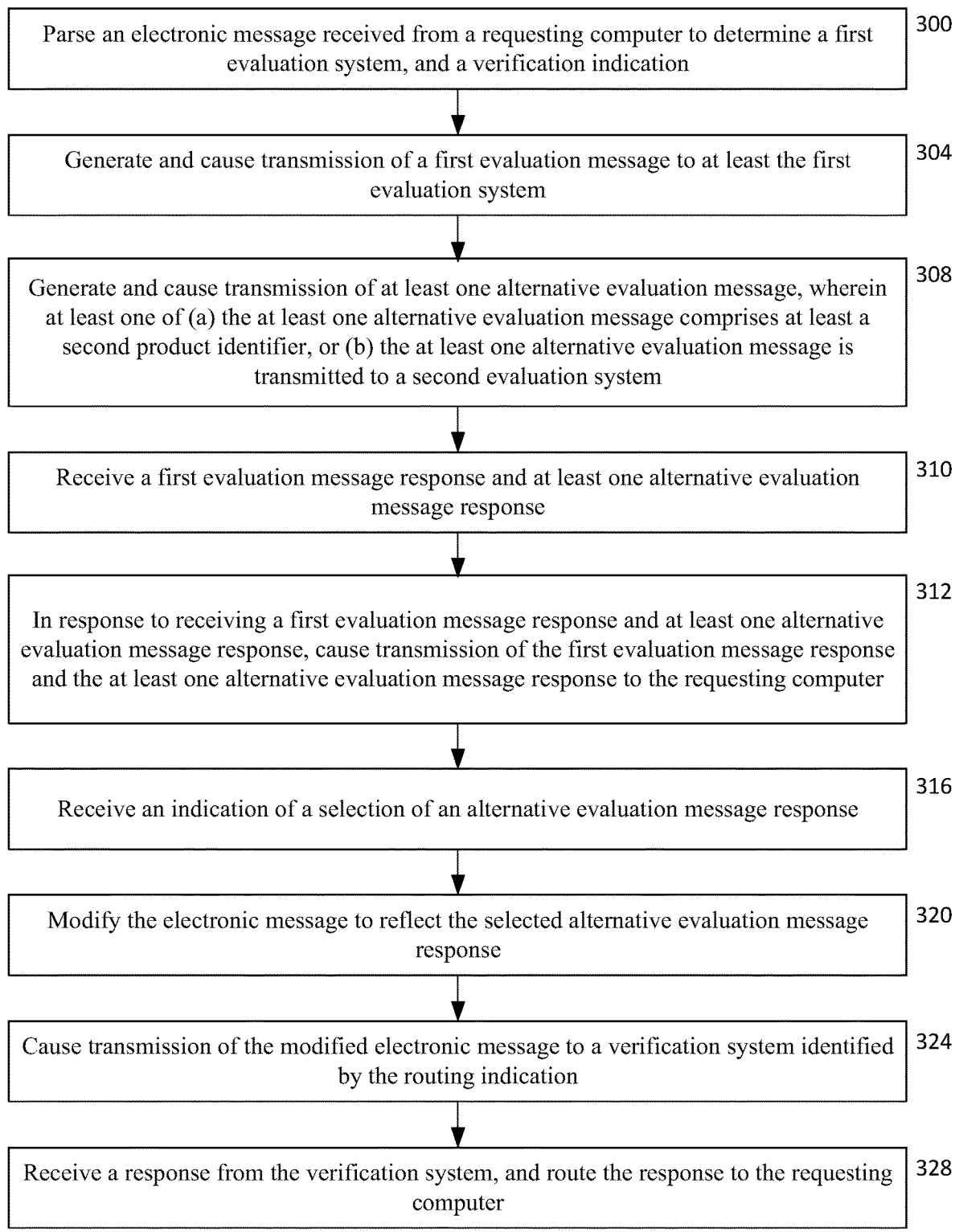

Having thus described embodiments of the invention in general terms, reference will now be made to the accompanying drawings, which are not necessarily drawn to scale, and wherein:

FIG. 1 is an example overview of a system that can be used to practice some example embodiments described herein;

FIG. 2 is an exemplary schematic diagram of an apparatus in accordance with some example embodiments; and FIG. 3 is a flowchart of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

Pharmacists have limited ability to determine the cost of the medication and costs associated with the patient's formulary alternatives without having to generate multiple billing transactions to the patient's insurance carrier or a service provider that indicates cash pricing. This process creates workflow inefficiencies for pharmacies which could lead to delays in dispensing medications, and additionally leads to unnecessary consumption of processing, memory, and network resources to process and route such requests throughout a network, reconcile responses, and route the responses accordingly. Such multiple requests can therefore bog down a system and cause performance issues.

When processing a refill for a patient that requires provider approval, the benefits for the patient may have changed which could further lead to higher cost of a medication intended to be dispensed. Even if the benefit plan is unchanged, a patient could be at a different stage in their deductible, which could further impact prescription drug pricing. For example, early in the plan year, a patient may not have met their deductible, but later in the plan year the patient may meet the deductible. Various medications can be moved on or off formulary for a particular plan, and/or change year to year even within the same plan.

In current systems, pharmacists or other users of a requesting computer often initiate a refill request when a patient has utilized all available refills but is requesting additional refills. The refill request is routed to a prescriber computer so that the prescriber can approve the refill request and the patient can obtain additional refills. In current systems, the pharmacist does not have insight to medication pricing until a later time when the refill is approved, then further processed by the pharmacy computer to initiate a prescription claim and to fill the order. When a response is received from the prescription benefit plan, the pharmacist is informed of pricing information, but at this time the prescribing computer and prescriber (physician and/or the like) has already processed and approved the refill request. To research pricing of medication and/or pricing alternatives, the pharmacist may have to submit the multiple inquiries as described above, wasting the processing, memory and network resources.

Example embodiments improve upon such systems by checking for alterative medications, and/or different pricing schemas for the same or alternative medications before the refill request is transmitted to the prescriber. In some embodiments, the pharmacy may opt in for such alternative inquires for all refill requests by default, or a pharmacist or other user of the requesting computer may indicate a request for alternative inquiries on a case-by-case basis. In any event, a service provider computer, upon receiving the refill request, performs a check for alternative medication such as one in the same therapeutic class, a generic or brand alternative, and/or the like. U.S. patent application Ser. No. 15/085,166, filed Mar. 30, 2016, and titled "Alternative Therapy Identification System," describes identifying alternative therapies, such as by using alternative therapy tables, and is hereby incorporated by reference in its entirety.

Additionally or alternatively, the service provider computer may determine a cash price for the medication or alternative medication and/or via a prescription benefit plan (e.g., commercial insurance plan and/or government sponsored plan) in which the patient is enrolled and is eligible for coverage. The service provider computer may perform such pricing inquiries with a cash discount card, and/or different plan or payer than with which the patient previously purchased the prescription and/or different plan or payer than which the patient typically utilizes or that the pharmacy has on record. U.S. patent applicant Ser. No. 16/867,286, filed May 5, 2020 and titled, "Method, Apparatus, And Computer Program Product For Constructing Electronic Message Responses Dependent Upon Historical Information," and U.S. Patent Publication No. 2022/0076797, filed Sep. 4, 2020, and titled, "Method, Apparatus, And Computer Program Product For Performing An Alternative Evaluation Procedure In Response To An Electronic Message." describe various methods for obtaining different out-of-pockets costs of prescription drugs for patients and are hereby incorporated by reference in their entireties.

The service provider computer returns a response, optionally including various alternatives for the medication and pricing, and the pharmacist may optionally select an alternative medication, cash pricing system, and/or payer such that the refill request is modified and then forwarded to the prescriber for approval. If an alternative medication is selected, the prescriber may recognize the alternative medication as an equivalent therapy and approve the refill request similarly as though the refill request was for the same prescription. The approved refill request can then be returned to the pharmacy computer and may be further routed as a prescription claim and processed for filling the prescription at the pharmacy.

FIG. 1 is an overview of a system that can be used to practice certain example embodiments. The requesting computer 104 may be any processor-driven device that facilitates the submission of messages to the service provider computer 106. Any number of requesting computers 104 may be present in a network to transmit messages to the service provider computer 106.

In certain embodiments, a requesting computer 104 may be associated with a pharmacy or pharmacy network to facilitate the filling of prescriptions, transmitting prescription claims, prescription inquiries, and/or prescription refill requests to a service provider computer 106, and/or the like. Further, it will be appreciated that the requesting computer 104 may be implemented as a pharmacy computer, and that references herein to a "requesting computer" may be interchanged with references to a "pharmacy computer."

The requesting computer 104 may therefore facilitate the submission of messages, such as prescription refill requests, made by pharmacists on behalf of patients or consumers, and the communication of information associated with such messages (e.g., prescription transactions) to the service provider computer 106. In certain example embodiments, the requesting computer 104 may be a point of sale device associated with a pharmacy. The execution of the computer-implemented instructions by the requesting computer 104 may form a special purpose computer or other particular machine that is operable to facilitate the submission of pharmacy transaction requests made by patients, pharmacists, and/or the like, and the communication of information associated therewith to a service provider computer 106.

The service provider computer 106 may include, but is not limited to, a processor-driven device that is configured for receiving, processing, and responding to messages (e.g., prescription transactions) from the requesting computer 104. The service provider computer 106 may process such messages by identifying alternative medications or therapy, if any, and/or by identifying alternative evaluation systems (e.g., cash systems and/or other payers). The service provider computer 106 may therefore perform any operations to determine pricing, or best pricing, of certain medication including alternative medication, for a patient.

The service provider computer 106 may route prescription inquiries to various evaluation systems 108, described in further detail below to obtain responses regarding pricing. In certain embodiments, the service provider computer 106 may receive responses from evaluation systems 108, and return responses, such as those indicating a patient out-of-pocket cost of a prescription drug or alternative to a requesting computer 104 from which an associated refill request originated. Accordingly, the service provider computer 106 may be operable to facilitate the receipt, routing, and/or processing of healthcare transactions such as prescription refill requests, prescription transactions, prescription claims, and/or associated responses amongst various components and/or subsystems such as, but not limited to, those depicted in FIG. 1.

In certain exemplary embodiments, the service provider computer 106 may be configured as or may comprise a switch or router that evaluates, modifies, reformats, generates, and/or routes transactions such as healthcare transactions and prescription transactions. For example, the service provider computer 106 may route transactions communicated from the requesting computer 104 to an evaluation system 108 configured to return information regarding the transactions, and/or the service provider computer 106 may poll an evaluation system accordingly. In certain embodiments, the service provider computer 106 may reformat transactions, such as refill request, into another form of transaction and modify the recipient information of the reformatted transaction before routing the reformatted transaction to another party, such as evaluation system 108 and/or verification system 109 (e.g., a prescriber computer, described in further detail below, and configured to verify, approve or reject refill requests). The service provider computer 106 may also optionally apply edits to at least some of the messages and/or transactions, and/or construct a separate message response for messages received via the switch.

In certain embodiments, an evaluation system 108 may be associated with a cash pricing system. The evaluation system 108 may comprise a computer system that receives, adjudicates, or otherwise processes a prescription claim on behalf of the payer associated with an evaluation system 108, such as a cash pricing system.

Cash pricing systems provide discounted prescription drugs to patients when the patient purchases a prescription at a particular pharmacy with which the cash pricing system has an agreement. In some instances, a pharmacy works in agreement with a cash pricing system to offer the cash price and/or discount on behalf of the cash pricing system. A pharmacy may agree to cooperate with the cash pricing system to keep up with competition in a price-competitive market. The pharmacy may receive a dispense fee for dispensing the drug under the cash pricing system, such that the pharmacy's revenue for a particular transaction may be the dispense fee, less the cost of ingredients (e.g., the drug), less any applicable administration fees.

In some instances, cash pricing systems enable a patient to present a cash discount card and to obtain a medication at a lower cost than what would otherwise be obtainable by submitting a prescription claim to a pharmacy benefits manager (PBM), or other insurance provider, for the same medication.

Additionally or alternatively, an evaluation system 108 may be associated with a payer of prescription benefits and/or prescription benefit manager, and may be associated with a commercial prescription insurance plan and/or government sponsored plan.

Accordingly, references herein to an "evaluation system" may be interchanged with the term "cash pricing system," and/or "prescription benefit manager computer," according to certain embodiments.

The service provider computer 106 may transmit responses from an evaluation system 108 regarding a prescription inquiry, to the requesting computer 104. For example, the service provider computer 106 may notify the requesting computer 104 of out of pocket costs to be paid by the patient for various prescription drugs, such as an initially prescribed drug and/or alternative prescription, and certain embodiments may provide costs under different evaluation systems, such as a cash pricing system and/or prescription benefit plan. In this regard, a message or other notification may be appended to or included in the response transmitted to the requesting computer 104 indicating the evaluation system 108 associated with a respective medication and/or price. Any number of responses may be provided to the requesting computer 104 in association with a received refill request, and/or aggregated or compiled into a response to provide to the requesting computer 104. Accordingly, the service provider computer 106 may reformat the refill request to include the details of such responses, and transmit the reformatted refill request to the requesting computer 104. A user of the requesting computer 104, such as a pharmacist, may make a selection of a particular prescription drug and/or evaluation system (e.g., cash pricing system and/or other payer), and the service provider computer 106 may further modify the refill request before forwarding the refill request to a verification system 109.

The verification system 109 may be a prescriber computer, such as one in association with a physician, hospital, and/or other medical provider. The verification system 109 receives refill requests from the service provider computer 106, and enables a user to indicate to approve or reject the refill request.

The historical data source 110 may comprise any computing device configured to provide historical information and/or data, such as but not limited to the data received in various transactions and from various evaluation systems 108. The historical information may therefore comprise historical cash pricing information as provided under various cash pricing systems and/or historical out-of-pocket costs for prescription drugs under various prescription benefit plans. For example, the historical data source 110 may be a system or database configured to track pricing offered by various evaluation systems.

According to certain embodiments, the historical data source 110 may be maintained or operated by various requesting computers 104, such as in instances in which a pharmacy tracks historical data or historical pricing of cash transactions occurring at the pharmacy. Additionally or alternatively, the historical data source 110 may be maintained or operated by the service provider computer 106, as it functions as a switch for routing and processing certain transactions submitted by various requesting computers 104.

Referring now to FIG. 2, apparatus 200 is a computing device(s) configured for implementing requesting computer 104, service provider computer 106, evaluation system 108, verification system 109, historical data source 110, and/or alternative therapy tables 112, according to example embodiments.

Apparatus 200 may at least partially or wholly embody or be embodied by any of the requesting computer 104, service provider computer 106, and/or evaluation system 108. Apparatus 200 may therefore implement any of the requesting computer 104, service provider computer 106, and/or evaluation system 108, in accordance with some example embodiments, or may be implemented as a distributed system that includes any of the requesting computer 104, service provider computer 106, evaluation system 108, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional some components, such as the service provider computer 106, and/or evaluation system 108, for example. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the requesting computer 104, service provider computer 106, evaluation system 108, verification system 109, historical data source 110, alternative therapy tables 112, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as requesting computer 104, service provider computer 106, evaluation system 108, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry-in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as service provider computer 106, memory 214 may be configured to store computer program code for performing corresponding functions thereof, as described herein according to example embodiments.

Still further, memory 214 may be configured to store routing tables, that facilitate determining the destination of communications received from a requesting computer 104, and/or evaluation system 108. Memory 214 may further include reconciliation tables for tracking the healthcare transactions, such as refill requests, received from the requesting computer 104, and reconciling them with responses received from evaluation system 108. The memory 214 may further comprise a database, such as historical data source 110, comprising cash prices of particular medications, and/or alternative therapy tables 112, comprising alternative medications by prescription identifier (e.g., national drug code (NDC)). Still further, according to certain embodiments, the memory 214 may be modified as described herein, to reformat refill requests, prescription claims and/or prescription transactions with additional information received, determined and/or generated according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases that may store a variety of files, content, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 is implemented as the requesting computer 104, the user interface 216 may, in some example embodiments, provide means for user entry of payer information, details relating to the dispensing of a prescription, request for a refill, and/or the like. The user interface 216 may be further configured to display or provide evaluation responses and patient pay amounts of prescription medications, such as when apparatus 200 is implemented as a requesting computer 104. The user interface 216 of verification system 109 may be configured for display of a refill request (including a modified refill request) so that a prescriber or other user may approve or reject a refill request. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of requesting computer 104, service provider computer 106, evaluation system 108, verification system 109, historical data source 110, alternative therapy tables 112, and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods.

A network, such as the network in which any of the systems of FIG. 1 or components thereof or components described herein may operate, (e.g., requesting computer 104, service provider computer 106, evaluation system 108, historical data source 110, apparatus 200, and/or the like) may include a local area network, the Internet, any other form of a network, or any combination thereof, including proprietary private and semi-private networks and public networks. The network may comprise a wired network and/or a wireless network (e.g., a cellular network, wireless local area network, wireless wide area network, some combination thereof, and/or the like).

FIG. 3 is a flowchart illustrating example operations of an apparatus 200, according to some example embodiments. The operations of FIG. 3 may be performed by apparatus 200, such as with the service provider computer 106, and/or the like and relate to a refill request beginning initiated by a requesting computer 104, that is further processed by the service provider computer 106 according to example embodiments. Prior to certain operations of FIG. 3 relating to a refill, a prescription may be processed as described below.

According to certain embodiments, the service provider computer 106 receives a patient's benefit coverage inquiry that is generated by a prescriber computer, such as via an electronic health record (EHR) system, then obtains a response from the patient's PBM or other payer that facilities their prescription benefit coverage, and/or the service provider computer's estimation engine will return an estimated range that a patient can expect to pay for their prescription. The service provider computer 106 may also return a flag to the prescriber indicating that the prescription can be submitted to the pharmacy (such as when the EHR/Health System and the pharmacy is contracted to be supported by the service provider computer. The service provider computer 106 will receive a prescription order that is generated by the prescriber or the prescriber's staff via an EHR system or Health system using HL7 (FHIR) standards or a proprietary transaction. The service provider computer 106 will perform a validation check to ensure that all required fills are populated.

If a field validation is triggered and indicates errors, the service provider computer 106 will return a response to the EHR or Health System indicating what required data elements are missing and request that they are populated prior to the prescription order being sent to the pharmacy. The service provider computer 106 may therefore require that the data is added before the prescription order is reprocessed, and re-validated the prescription order Once validated, the service provider computer 106 may then convert the prescription order into National Council for Prescription Drug Programs (NCPDP) SCRIPT standard for processing.

The service provider computer 106 will also combine the benefit response with the prescription order so that the transmission not only includes the clinical details for the prescription, but it also includes the patient's pharmacy benefit information that is displayed to the prescriber or the prescriber's staff. The service provider computer 106 will then review the order to determine the ultimate recipient of the prescription order. The service provider computer 106 will facilitate all routing and determine the ultimate delivery of the prescription order based upon the identifier (NPI or NCPDP ID) of the pharmacy that will dispense. The service provider computer will check configuration tables and databases that map the pharmacy identifier that will route the prescription order to the to a specific URL that is configured at the pharmacy chain, pharmacy software vendor, outpatient pharmacy, buying group, pharmacy service administrative organization PSAO or independent pharmacy level, then transmit the order to the identified destination. The pharmacy will then process the prescription order and it is adjudicated to determine the patient's financial responsibility.

In some instances a patient may obtain refills. In some instances, a patient may seek refills, but no refills are available or all initially available have already been filled. As reflected in FIG. 3, the service provider computer 106 according to example embodiments supports a pharmacy generating a refill request when the patient needs subsequent fills, but needs approval from the prescriber. However, based on the timing of the refill request, the patient's benefits may have changed and/or or restarted at the beginning of the year such that their stage in a deductible is different than when they last purchased the prescription. The service provider computer 106 according to example embodiments and as described with respect to FIG. 3 enables the requesting computer 104, such as a pharmacy computer, to initiate generation of a prescription benefit inquiry prior to processing the refill request that is sent electronically to the prescriber for approval. In prior systems, the pharmacy computer may initiate a refill request, but such refill requests indicate the previously prescribed medication, and the pharmacist has no insight to the pricing of a refill.

Accordingly, as shown by operation 300 of FIG. 3, apparatus 200 may include means, such as processor 212, memory 214, user interface 216, communication interface 218, and/or the like, for parsing an electronic message received from a requesting computer to determine a first evaluation system, and a verification indication. The verification indication may be a flag or any other indicator indicative of a refill request for a prescription medication (such that the prescription refill needs to be verified by a prescriber), and may therefore include a prescription identifier identifying a drug (e.g., national drug code (NDC)) to be refilled. The first evaluation system may include insurance information, for example, of the patient. As another example, the first evaluation system may indicate a cash pricing system previously used by the patient to obtain the prescription at a cash price, or any other cash pricing system identified by the requesting computer 104. In certain embodiments, both a cash pricing system and insurance information may be indicated in the message. The verification indication may include any indicator that the prescription transaction is a refill request, such that the refill request needs to be approved by a prescriber or physician utilizing a user interface of the verification system, prior to being filled.

The electronic message (e.g., refill request) may be received from the requesting computer 104, such as following entry by a pharmacist, or other user, of data relating to a prescription drug attempting to be refilled, insurance information relating to the first evaluation system, indication of a cash pricing system relating to the first evaluation system, and/or a prescriber that prescribed the prior prescription. The requesting computer 104 may store any information from a prior prescription transaction, such as information described herein, to populate the refill request. In this regard, the message (e.g., refill request) may include a prescription claim entered by a healthcare provider, such as a pharmacist, when a patient seeks additional refills to be approved by their physician (when no available refills remain). The message (e.g., refill request) may be received at the service provider computer 106 for further processing as described below.

As shown by operation 304, apparatus 200 may include means, such as processor 212, memory 214, communication interface 218, and/or the like, for generating and causing transmission of a first evaluation message to at least the first evaluation system. In this regard, the service provider computer 106 may initiate a first evaluation message (e.g., prescription benefit inquiry) toward the first evaluation system, such as an evaluation system 108 identified by the patient's insurance, preferred cash pricing system, and/or the like, which may be identified by a PCN and/or BIN, for example. Said differently, the service provider computer 106 may poll a certain evaluation system 108 identified based on a PCN, BIN, and/or the like.

In this regard, in certain embodiments, polling the first evaluation system or transmitting a first evaluation message may include, or may result in, receiving, from the evaluation system, a first evaluation message regarding the transaction. In certain embodiments, the first evaluation message may include at least a patient pay amount for the prescription drug. The switch of the service provider computer 106 may receive a data feed of responses from various evaluation systems 108 (e.g., PBM's associated with commercial insurance payers, cash pricing systems and/or other payers). An identifier included in a message response may be associated with a transmitted message to the evaluation system such that the service provider computer 106 reconciles a response with the associated request (e.g. evaluation message).

As shown by operation 308, apparatus 200 may include means, such as processor 212, memory 214, communication interface 218, and/or the like, for generating and causing transmission of at least one alternative evaluation message, wherein at least one of (a) the at least one alternative evaluation message comprises at least a second product identifier, or (b) the at least one alternative evaluation message is transmitted to a second evaluation system.

Generating the alternative evaluation message may include determining an alternative, or second product identifier, associated with the prescription drug indicated by the electronic message. Accordingly, the second product identifier may identify an alternative drug or formulary alternative to a product identified by the first product identifier, such as an alternative drug identified in an alternative therapy table 112, and/or by any process described in U.S. patent application Ser. No. 15/085,166.

Additionally or alternatively, an alternative evaluation message may indicate a different evaluation system than the first evaluation system. For example, if the first evaluation system is a PBM associated with a benefit plan, the second evaluation system may be a cash pricing system. If the first evaluation system is a cash pricing system, the second evaluation system may be a PBM associated with a benefit plan. U.S. patent application Ser. No. 16/867,286 and U.S. Patent Publication No. 2022/0076797 provide examples of methods for determining cash prices and/or patient pay amounts under prescription benefit plans, but it will be appreciated that any such method for determining pricing may be utilized. In certain embodiments, historical data source 110 may be utilized to determine or estimate pricing.

One or more prescription benefit inquiries may then be transmitted in the form of an alternative evaluation message. In certain examples, if an alternative product, such as an alternative medication, is identified by a second product identifier, in some examples multiple alternative evaluation messages may be generated for different evaluation systems (such as a first and/or second evaluation system). Any number of alternative evaluation messages may be generated and transmitted, such as in attempt to identify the best value prescription drug for the patient.

As shown by operation 310, apparatus 200 may include means, such as processor 212, memory 214, communication interface 218, and/or the like, for receiving a first evaluation message response and at least one alternative evaluation message response. Responses associated with any or all of the messages caused to be transmitted in operation 308 may be received via the communication interface 218 and reconciled with their respective electronic messages. For example, an identifier included in a request transmitted with respect to operation 308 may be included in a response such that the service provider computer 106 reconciles the requests and responses, such as with routing table, and determines a requesting computer 104 to which to route responses.

In certain embodiments, a first evaluation message response may reflect a patient pay amount for a refill of the previously prescribed medication, and in certain embodiments may include any combination of a price based on insurance coverage, rebates, cash pricing, and/or the like. The alternative evaluation message response may reflect a patient pay amount according to the second product identifier or the at least one alternative evaluation system, and may include any combination of a price based on insurance coverage, rebates, cash pricing, and/or the like.

As shown by operation 312, apparatus 200 may include means, such as processor 212, memory 214, user interface 216, communication interface 218, and/or the like, for in response to receiving a first evaluation message response and at least one alternative evaluation message response, causing transmission of the first evaluation message response and the at least one alternative evaluation message response to the requesting computer. In this regard, any number of responses, including alternative evaluation message responses may be provided to the requesting computer 104.

Example embodiments may cause the communication and display of information from the various responses, such as with computer program code to direct the user interface 216 of the requesting computer 104. A user such as the pharmacist may therefore review different options for alternative therapies and/or evaluation systems (e.g., cash or PBM) and corresponding patient pay amounts. In some examples a user such as a pharmacist may discuss options with a patient. In certain embodiments, the information transmitted and received may include further details such that a user can determine rationale for different pricing. For example, at least one of the first evaluation message response or the at least one alternative evaluation message response may include deductible stage information. This may indicate to the pharmacist and/or patient that a cost of medication under a plan has gone up due to the resetting of payments toward a deductible (such as in a calendar year since the patient last obtained the prescription), or down due a deductible being met. Various information may be provided that may assist the pharmacist and/or patient in understanding different options and corresponding prices.

In any event, the user, such as a pharmacist, may select an option for the patient that the user determines as the best price, or best option for the patient, which may not always necessarily be the best price, dependent on other factors such as the patient's progress toward a deductible in an insurance plan. It will be appreciated that the operations 304, 308, 310, 312 and 316 occur in real-time or near real-time relative to the receipt of the electronic message referenced in operation 300. Description of near real-time processing allows for short delays due to computer processing time. In any event, when a pharmacist is interacting with a user interface and considering a refill request for a patient, the pharmacist can view the alternative options and pricing information in real-time or near real-time relative to having initiated the refill request transmitted to the service provider computer 106, which is unconventional in prior systems. The facilitation of submission for approval is also unconventional in prior systems, and is described in further detail below.

As shown by operation 316, apparatus 200 may include means, such as processor 212, memory 214, user interface 216, communication interface 218, and/or the like, for receiving an indication of a selection of an alternative evaluation message response. In this regard, a user such as a pharmacist may select a desired option for the patient, via a user interface 216, and the selected option is returned to the service provider computer 106. It will be appreciated that in some scenarios, the user may select the first evaluation message, and a corresponding refill request may then be transmitted to the verification system 109.

In an event, in response to an indication of a selection of an alternative evaluation message, as shown by operation 320, apparatus 200 may include means, such as processor 212, memory 214, communication interface 218, and/or the like, for modifying the electronic message to reflect the selected alternative evaluation message. In this regard, the service provider computer 106 changes at least one of the product identifier identifying the prescription drug, or the evaluation system (e.g., cash payment and/or PBM) in the electronic message according to the selection made via the requesting computer 104, such as a pharmacy computer.

As shown by operation 324, apparatus 200 may include means, such as processor 212, memory 214, user interface 216, communication interface 218, and/or the like, for causing transmission of the modified electronic message to a verification system identified by the routing indication. In this regard, the modified electronic message is routed to the verification system 109 with which the electronic message was associated. The verification system 109 may be a prescriber computer associated with the prior prescription transaction. A message may therefore be transmitted and displayed to a physician or prescriber, prompting the prescriber to approve a refill request that may include an alternative medication. In a circumstance in which the medication is not changed, but the evaluation system (e.g., cash or PBM) is changed, the prescriber may be presented with an option to approve the refill request. In any event, the prescriber using the verification system 109 can verify or approve the refill request as modified by the service provider computer 106, and a response, such as a refill response, is returned to the service provider computer 106 and routed to the requesting computer 104. The prescriber may alternatively reject the refill response and optionally provide a rationale or explanation. As another option, if the prescriber denies the refill request, the prescriber may select or indicate a different prescription (e.g., newRX), such as a follow-up response and to close the loop if the prescriber doesn't agree with the alternative medication and/or want to prescribe a different prescription for the patient.

As shown by operation 328, apparatus 200 may include means, such as processor 212, memory 214, communication interface 218, and/or the like, for receiving a response, such as a refill response, from the verification system 109, and routing the response to the requesting computer 104. The refill response may indicate the refill is approved or verified. If approved or verified, the pharmacy may fill the prescription for the patient and further initiate transmission, via the service provider computer 106, to an evaluation system 108 or related adjudication computer upon the patient obtaining the prescription. In some scenarios, the prescriber using verification system 109 may reject the refill request (optionally with a rationale, explanation, and/or different prescription drug indicated), which may be routed via the service provider computer 106 to the requesting computer 104 for display to the pharmacist or other user. A new prescription by the prescriber may be coded as a newRX.

Example embodiments provided herein therefore provide a technical solution to a technical problem presented by requesting computers, such as pharmacy computer, not having direct access to prescription pricing information, nor being configured to obtain prescriber approval of a prescription refill. Enabling the pharmacy or pharmacist to initiate a request via the electronic message reduces the number of transactions a pharmacist would otherwise need to attempt, and possibly cancel, while attempting to find a best price for a prescription drug. Additionally or alternatively, current systems may not enable a pharmacist to request a refill approval from a prescriber for a prescription other than the medication prescribed. Example embodiments therefore improve upon such systems by facilitating a change to an electronic message, as directed by a pharmacist or other user of a requesting computer, and by facilitating the approval process with the verification system, such as a prescriber computer.

Example embodiments are further integrated into a practical application of systematically generating alternative evaluation message, to provide improved information to the patient and/or pharmacy. This application in the area of prescription claims and prescription drug pricing provides an improvement to the technology of automated prescription pricing inquiries, service provider computers, requesting computers such as pharmacy computers, and/or the like.

Without the advantages of the present disclosure, pharmacists may have to research other prescriptions and submit multiple prescription inquiries and/or transactions via the service provider computer. Accordingly, example embodiments improve the technology of automated prescription pricing inquiries and service provider computers by providing the improvement to the requesting computer and associated pharmacy. Additionally, based on the reduced or limited need to submit multiple prescription inquiries for the same prescription transaction, example embodiments reduce or limit the processing resources, network resources, and memory resources otherwise required to facilitate the processing, routing, and completion of the otherwise submitted multiple prescription inquiries for the same transaction that without the advantages of disclosed example embodiments, would need to be used to "test" the pricing schemas and identify a good price or best price.

Moreover, in addition to reducing the number of additional claims that may otherwise be submitted to test pricing under different cash pricing systems, example embodiments may further need to process transaction reversals, to indicate to certain evaluation systems that the transaction will not be processed under their system. Reversals require additional processing, network, and memory resources to be routed and processed, such that example embodiments further reduce the required processing and memory resources that would otherwise be expended on the facilitation, processing and routing of reversal transactions. The reduction in the utilization of such resources may be realized by the requesting computer 104, service provider computer 106, and/or evaluation system 108.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIG. 3 illustrates operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
    parse an electronic message, indicative of a refill request associated with a first product identifier, and received from a pharmacy computer, to determine a first evaluation system associated with a prescription benefit manager or a cash pricing system, and a prescriber computer associated with a prescription of the first product;
    generate and cause transmission of a first evaluation message to at least the first evaluation system;
    generate and cause transmission of at least one alternative evaluation message, wherein at least one of (a) the at least one alternative evaluation message comprises at least a second product identifier, or (b) the at least one alternative evaluation message is transmitted to a second evaluation system associated with a different prescription benefit manager or a different cash pricing system than the first evaluation system;
    in response to receiving a first evaluation message response and at least one alternative evaluation message response, cause transmission of the first evaluation message response and the at least one alternative evaluation message response to the pharmacy computer, wherein at least one of the first evaluation message response or the at least one alternative evaluation message response comprises an indicator of whether the deductible is satisfied, an indicator of progress toward satisfaction of the deductible, and a deductible reset date, and wherein the indicator of whether the deductible is satisfied, the indicator of progress toward satisfaction of the deductible, and the deductible reset date are provided via a user interface of the pharmacy computer;
    receive an indication of a selection of an alternative evaluation message response;
    modify the electronic message to reflect the selected alternative evaluation message response by modifying at least one of: (a) the first product identifier to the second product identifier, or (b) the first evaluation system to the second evaluation system;
    in an instance the first product identifier in the electronic message is modified to the second product identifier, cause transmission of the modified electronic message to the prescriber computer for approval; and
    in an instance the first evaluation system in the electronic message is modified to the second evaluation system, cause transmission of the electronic message to the second evaluation system.

2. The apparatus according to claim 1, wherein the first evaluation message response and the at least one alternative evaluation message response is caused to be transmitted to the pharmacy computer in real-time or near real-time relative to receiving the electronic message from the pharmacy computer.

3. The apparatus according to claim 1, wherein generating the at least one alternative evaluation message comprises determining the second product identifier by identifying a formulary alternative to a product identified by the first product identifier.

4. The apparatus according to claim 1, wherein the first evaluation system is associated with a prescription benefit plan and the second evaluation system is associated with a cash price.

5. The apparatus according to claim 1, wherein the at least one memory and the computer program code configured to, with the processor, cause the apparatus to at least:
cause display of the at least first evaluation message response and the alternative evaluation message response via the pharmacy computer.

6. The apparatus according to claim 1, wherein the at least one memory and the computer program code configured to, with the processor, cause the apparatus to at least:
receive a response from the verification system indicating approval; and
cause transmission of the response to the pharmacy computer.

7. A method comprising:
parsing an electronic message, indicative of a refill request associated with a first product identifier, and received from a pharmacy computer to determine a first evaluation system associated with a prescription benefit manager or a cash pricing system, and a prescriber computer associated with a prescription of the first product;
generating and causing transmission of a first evaluation message to at least the first evaluation system;
generating and causing transmission of at least one alternative evaluation message, wherein at least one of (a) the at least one alternative evaluation message comprises at least a second product identifier, or (b) the at least one alternative evaluation message is transmitted to a second evaluation system associated with a different prescription benefit manager or a different cash pricing system than the first evaluation system;
in response to receiving a first evaluation message response and at least one alternative evaluation message response, causing transmission of the first evaluation message response and the at least one alternative evaluation message response to the pharmacy computer, wherein at least one of the first evaluation message response or the at least one alternative evaluation message response comprises an indicator of whether the deductible is satisfied, an indicator of progress toward satisfaction of the deductible, and a deductible reset date, and wherein the indicator of whether the deductible is satisfied, the indicator of progress toward satisfaction of the deductible, and the deductible reset date are provided via a user interface of the pharmacy computer;
receiving an indication of a selection of an alternative evaluation message response;
modifying the electronic message to reflect the selected alternative evaluation message response by modifying at least one of: (a) the first product identifier to the second product identifier, or (b) the first evaluation system to the second evaluation system;
in an instance the first product identifier in the electronic message is modified to the second product identifier, causing transmission of the modified electronic message to the prescriber computer for approval; and
in an instance the first evaluation system in the electronic message is modified to the second evaluation system, causing transmission of the electronic message to the second evaluation system.

8. The method according to claim 7, wherein the first evaluation message response and the at least one alternative evaluation message response is caused to be transmitted to the pharmacy computer in real-time or near real-time relative to receiving the electronic message from the pharmacy computer.

9. The method according to claim 7, wherein generating the at least one alternative evaluation message comprises determining the second product identifier by identifying a formulary alternative to a product identified by the first product identifier.

10. The method according to claim 7, further comprising:
causing display of the at least first evaluation message response and the alternative evaluation message response via the pharmacy computer.

11. The method according to claim 7, further comprising:
receiving a response from the prescriber computer indicating approval; and
causing transmission of the response to the pharmacy computer.

12. A computer program product comprising at least one non-transitory computer-readable storage medium having computer-executable program code instructions stored therein, the computer-executable program code instructions comprising program code instructions to:
parse an electronic message, indicative of a refill request associated with a first product identifier, and received from a pharmacy computer to determine a first evaluation system associated with a prescription benefit manager or a cash pricing system, and a prescriber computer associated with a prescription of the first product;
generate and cause transmission of a first evaluation message to at least the first evaluation system;
generate and cause transmission of at least one alternative evaluation message, wherein at least one of (a) the at least one alternative evaluation message comprises at least a second product identifier, or (b) the at least one alternative evaluation message is transmitted to a second evaluation system associated with a different prescription benefit manager or a different cash pricing system than the first evaluation system;
in response to receiving a first evaluation message response and at least one alternative evaluation message response, cause transmission of the first evaluation message response and the at least one alternative evaluation message response to the pharmacy computer, wherein at least one of the first evaluation message response or the at least one alternative evaluation message response comprises an indicator of whether the deductible is satisfied, an indicator of progress toward satisfaction of the deductible, and a deductible reset date, and wherein the indicator of whether the deductible is satisfied, the indicator of progress toward satisfaction of the deductible, and the deductible reset date are provided via a user interface of the pharmacy computer;
receive an indication of a selection of an alternative evaluation message response;
modify the electronic message to reflect the selected alternative evaluation message response by modifying at least one of: (a) the first product identifier to the second product identifier, or (b) the first evaluation system to the second evaluation system;
in an instance the first product identifier in the electronic message is modified to the second product identifier, cause transmission of the modified electronic message to the prescriber computer for approval; and in an instance the first evaluation system in the electronic message is modified to the second evaluation system, cause transmission of the electronic message to the second evaluation system.

13. The computer program product according to claim 12, wherein the first evaluation message response and the at least one alternative evaluation message response is caused to be transmitted to the pharmacy computer in real-time or near real-time relative to receiving the electronic message from the pharmacy computer.

14. The computer program product according to claim 12, wherein generating the at least one alternative evaluation message comprises determining the second product identifier by identifying a formulary alternative to a product identified by the first product identifier.

15. The computer program product according to claim 12, wherein the first evaluation system is associated with a prescription benefit plan and the second evaluation system is associated with a cash price.

16. The computer program product according to claim 12, wherein the computer-executable program code instructions further comprise program code instructions to:
   cause display of the at least first evaluation message response and the alternative evaluation message response via the pharmacy computer.

\* \* \* \* \*